(12) United States Patent
Takahashi et al.

(10) Patent No.: US 12,076,644 B2
(45) Date of Patent: Sep. 3, 2024

(54) COMPUTER-READABLE RECORDING MEDIUM, GAME APPARATUS, AND GAME EXECUTION METHOD

(71) Applicant: SQUARE ENIX CO., LTD., Tokyo (JP)

(72) Inventors: Mitsunori Takahashi, Tokyo (JP); Naoki Hamaguchi, Tokyo (JP); Nobuyuki Matsuoka, Tokyo (JP); Ryota Iwagami, Tokyo (JP); Teruki Endo, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 270 days.

(21) Appl. No.: 16/941,731

(22) Filed: Jul. 29, 2020

(65) Prior Publication Data

US 2021/0031107 A1 Feb. 4, 2021

(30) Foreign Application Priority Data

Jul. 31, 2019 (JP) .................. 2019-141777

(51) Int. Cl.
*A63F 13/55* (2014.01)
*A63F 13/45* (2014.01)
*A63F 13/537* (2014.01)
*A63F 13/822* (2014.01)

(52) U.S. Cl.
CPC .............. *A63F 13/55* (2014.09); *A63F 13/45* (2014.09); *A63F 13/537* (2014.09); *A63F 13/822* (2014.09)

(58) Field of Classification Search
CPC ........ A63F 13/55; A63F 13/45; A63F 13/537; A63F 13/822
See application file for complete search history.

(56) References Cited

U.S. PATENT DOCUMENTS

| 5,390,937 A | 2/1995 | Sakaguchi et al. |
| 5,649,862 A | 7/1997 | Sakaguchi et al. |
| 6,354,940 B1 * | 3/2002 | Itou ................ A63F 13/44 463/43 |
| RE37,948 E | 12/2002 | Sakaguchi et al. |

(Continued)

FOREIGN PATENT DOCUMENTS

| JP | 06105959 A | 4/1994 |
| JP | 2001-300143 A | 10/2001 |

(Continued)

OTHER PUBLICATIONS

Studio-M Co.,ltd . . . Kurohyou 2, Ryuugagotoku, Ashura-edition, Kanzenkouryaku-kiwaminosyo, Enterbrain, Inc., Koichi Hamamura, published on May 10, 2012, 1st Edition, pp. 34-50 and pp. 58-61 (Year: 2012).*

(Continued)

*Primary Examiner* — Justin L Myhr
*Assistant Examiner* — Carl V Larsen
(74) *Attorney, Agent, or Firm* — GREENBLUM & BERNSTEIN, P.L.C.

(57) ABSTRACT

To provide a game program capable of achieving high amusement.
A game program causes an object to execute a first action by a player's operation, and changes a first parameter with the passage of time; and causes the object to execute a second action by the player's operation in a case where the first parameter satisfies a predetermined first condition.

11 Claims, 13 Drawing Sheets

(56) References Cited

U.S. PATENT DOCUMENTS

| | | | | |
|---|---|---|---|---|
| 7,789,741 | B1* | 9/2010 | Fields | A63F 13/49 463/2 |
| 2008/0248845 | A1* | 10/2008 | Morgan | A63F 13/30 463/1 |
| 2018/0050266 | A1* | 2/2018 | Minagawa | G05G 9/047 |

FOREIGN PATENT DOCUMENTS

| | | |
|---|---|---|
| JP | 2010-088674 | 4/2010 |
| JP | 2016-179134 | 10/2016 |
| JP | 2018-099296 A | 6/2018 |

OTHER PUBLICATIONS

Kurohyou 2: Ryu ga Gotoku Ashura-hen. yakuza.fandom.com. Online. 2012. Accessed via the internet. Accessed Jul. 1, 2022. <URL: https://yakuza.fandom.com/wiki/Kurohyou_2:_Ryu_ga_Gotoku_Ashura-hen> (Year: 2012).*

SkyrimSouls Slow Motion Menu. Nexusmods.com. Online. May 13, 2017. Accessed via the internet. Accessed Jul. 1, 2022. <URL: https://www.nexusmods.com/skyrim/mods/83827> (Year: 2017).*

Hatred and Discipline. diablo.fandom.com. Online. May 13, 2018. Accessed via the internet. Accessed Jul. 1, 2022. <URL: https://diablo.fandom.com/wiki/Hatred_and_Discipline?oldid=175379> (Year: 2018).*

Smoke Screen. diablo.fandom.com. Online. Feb. 6, 2016. Accessed via the internet. Accessed Jul. 1, 2022. <URL: https://diablo.fandom.com/wiki/Smoke_Screen?oldid=149563> (Year: 2016).*

Heat Actions. yakuza.fandom.com. Online. Jul. 2, 2019. Accessed via the internet. Accessed Jul. 1, 2022. <URL: https://yakuza.fandom.com/wiki/Heat_Actions?oldid=53106> (Year: 2019).*

Super Meter. Giantbomb.com. Online. Oct. 19, 2014. Accessed via the internet. Accessed Jul. 1, 2022. <URL: https://web.archive.org/web/20141019024038/http://www.giantbomb.com/super-meter/3015-1013/> (Year: 2014).*

Limit Break (Final Fantasy VIII). https://finalfantasy.fandom.com/. Online. Jul. 5, 2018. Accessed via the Internet. Accessed Jan. 14, 2023. <URL: https://finalfantasy.fandom.com/wiki/Limit_Break_(Final_Fantasy_VIII)?oldid=2909017> (Year: 2018).*

Lego Marvel Super Heroes 2 Manual. Online. 2018. Accessed via the Internet. Accessed May 20, 2023. <URL: https://support.feralinteractive.com/docs/en/legomarvelsuperheroes2/latest/steam/manual/#!spread9> (Year: 2018).*

Lego Marvel Super Heroes 2. Wikipedia.org. Online. Accessed via the Internet Access May 20, 2023. <URL: https://en.wikipedia.org/wiki/Lego_Marvel_Super_Heroes_2> (Year: 2018).*

Official communication dated May 18, 2021 and issued in Japanese patent application No. 2019-141777 along with English translation.

Office Action dated Feb. 1, 2022 issued in Japanese patent application No. 2019-141777 along with an English translation.

Koichi Hamamura, Studio-M Co., ltd., Kurohyou 2, Ryuugagotoku, Ashura-edition, Kanzenkouryaku-kiwaminosyo, Enterbrain, Inc., published May 10, 2012, 1$^{st}$ Edition.

Parasite eve, Squaresoft, published on Mar. 31, 2005.

Final Fantasy VII, Square Co., Ltd., Squaresoft, published Mar. 31, 2005.

Japanese Office Action dated Sep. 8, 2020 issued in Japan Patent Application No. 2019-141777.

* cited by examiner

COMPUTER-READABLE RECORDING MEDIUM, GAME APPARATUS, AND GAME EXECUTION METHOD

CROSS REFERENCE TO RELATED APPLICATION

The present disclosure relates to subject matter contained in Japanese Patent Application No. 2019-141777, filed on Jul. 31, 2019, the disclosure of which is expressly incorporated herein by reference in its entirety.

TECHNICAL FIELD

The present invention relates to a computer-readable recording medium, a game apparatus, and a game execution method.

BACKGROUND ART

In the related art, a so-called role playing game (RPG) in which a player character operated by a player grows through a virtual battle with an opponent character and a story progresses is enjoyed. A virtual battle between a player character and an opponent character in such an RPG may employ a turn base in which an action such as attack or item use corresponding to the number of times determined in one turn can be executed by each character. As a technique more realistic than the turn base, there is an active time battle base in which a character executes an action with the passage of time (for example, refer to PTL 1).

CITATION LIST

Patent Literature

PTL 1: JP-A-H06-105959

SUMMARY OF INVENTION

Technical Problem

However, in the turn-based RPG of the related art, a player takes time to examine what kind of action is to be executed by a player character, but a virtual battle does not progress in real time, and thus the amusement of the game may be reduced. On the other hand, in the active time battle-based RPG of the related art, a virtual battle progresses in real time, but a player does not take time to examine what kind of action is to be executed by a player character, and thus the amusement of the game may be reduced.

An object of at least one of embodiments of the present invention is to provide a game program, a game apparatus, and a game execution method capable of achieving high amusement.

Solution to Problem

According to a non-limiting aspect, a non-transitory computer-readable recording medium including a game program executed in a computer apparatus, the game program causing the computer apparatus to function as a first action executer that causes an object to execute a first action by a player's operation, a first parameter changer that changes a first parameter with the passage of time, a second action executer that causes the object to execute a second action by the player's operation in a case where the first parameter satisfies a predetermined first condition, and a game progressor that causes a game to progress in response to execution of the first action and the second action.

According to a non-limiting aspect, a game apparatus comprising a first action executer that causes an object to execute a first action by a player's operation, a first parameter changer that changes a first parameter with the passage of time, a second action executer that causes the object to execute a second action by the player's operation in a case where the first parameter satisfies a predetermined first condition, and a game progressor that causes a game to progress in response to execution of the first action and the second action.

According to a non-limiting aspect, a game execution method executed in a computer apparatus, the game execution method comprising causing an object to execute a first action by a player's operation, changing a first parameter with the passage of time, causing the object to execute a second action by the player's operation in a case where the first parameter satisfies a predetermined first condition, and causing a game to progress in response to execution of the first action and the second action.

Advantageous Effects of Invention

One or more of the above problems can be solved with each embodiment of the present invention.

DESCRIPTION OF EMBODIMENTS

Hereinafter, embodiments of the invention will be described with reference to the accompanying drawings. Hereinafter, description relating to effects shows an aspect of the effects of the embodiments of the invention, and does not limit the effects. Further, the order of respective processes that form a flowchart described below may be changed in a range without contradicting or creating discord with the processing contents thereof.

First Embodiment

Figure 1:
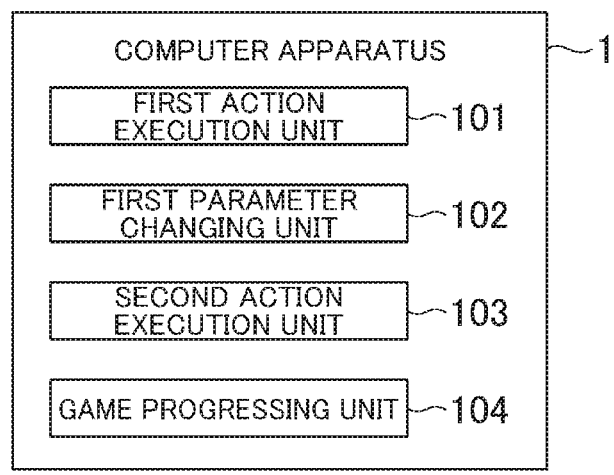
FIG. 1 is a block diagram illustrating a configuration of a computer apparatus corresponding to at least one of embodiments of the present invention.

A description will be made of an outline of a first embodiment of the present invention. FIG. 1 is a block diagram illustrating a configuration of a computer apparatus corresponding to at least one of embodiments of the present invention. A computer apparatus 1 includes at least a first action execution unit 101, a first parameter changing unit 102, a second action execution unit 103, and a game progressing unit 104.

The first action execution unit 101 has a function of causing an object to execute a first action by a player's operation. The first parameter changing unit 102 has a function of changing a first parameter with the passage of time. The second action execution unit 103 has a function of causing the object to execute a second action by the player's operation in a case where the first parameter satisfies a predetermined first condition. The game progressing unit 104 has a function of causing a game to progress in response to execution of the first action and the second action.

Figure 2:
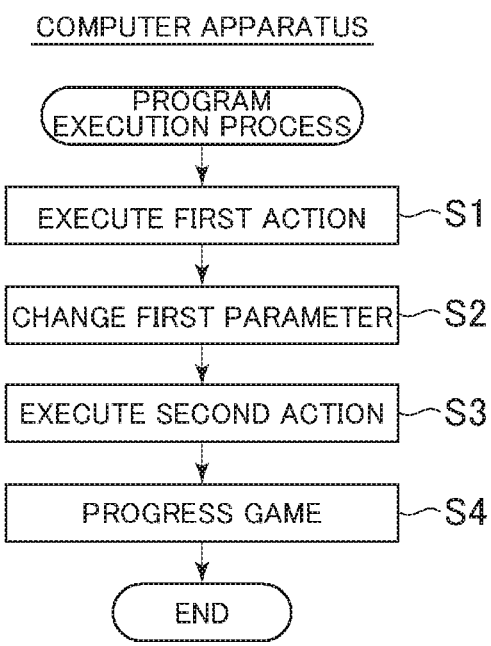
FIG. 2 is a flowchart illustrating a program execution process corresponding to at least one of embodiments of the present invention.

Next, a description will be made of a program execution process in the first embodiment of the present invention. FIG. 2 is a flowchart illustrating a program execution process corresponding to at least one of embodiments of the present invention.

The computer apparatus 1 causes an object to execute a first action by a player's operation (step S1). The computer apparatus 1 changes a first parameter with the passage of time (step S2). The computer apparatus 1 causes the object to execute a second action by the player's operation in a case where the first parameter satisfies a predetermined first condition (step S3). Next, the computer apparatus 1 causes a game to progress in response to execution of the first action and the second action (step S4), and terminates the process.

As one aspect of the first embodiment, it is possible to provide a game program achieving high amusement.

In the first embodiment, the "computer apparatus" means an apparatus that includes a storage and a controller and can perform calculation according to a predetermined program, and means, for example, a stationary game console, a portable game console, a wearable terminal, a desktop or notebook type personal computer, a tablet computer, or a PDA. The "object" means, for example, a character operated by a player.

The "first action" is not particularly limited as long as the action can be executed by an object, and may include, for example, an action of attacking an opponent object, or an action of recovering or assisting an object operated by a player or an object serving as an ally of the player. The "first parameter" means, for example, a parameter that is increased or decreased with the passage of time. The "first condition" is a condition in which an object can be caused to execute the second action, and may be, for example, a condition in which the first parameter is equal to or more than a predetermined threshold value. The "second action" is not particularly limited as long as the action can be executed by an object, and may include, for example, an action of making a special attack on an opponent object, an action of using a spell, or an action of using an item, unlike the first action.

Second Embodiment

Figure 3:
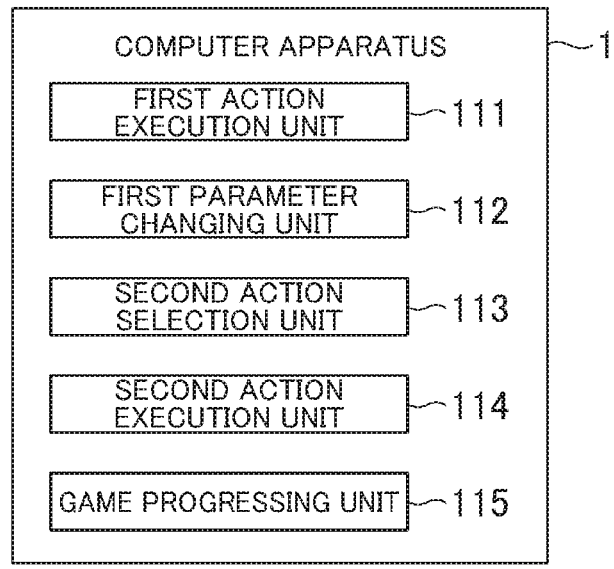
FIG. 3 is a block diagram illustrating a configuration of a computer apparatus corresponding to at least one of embodiments of the present invention.

Next, a description will be made of an outline of a second embodiment of the present invention. FIG. 3 is a block diagram illustrating a configuration of a computer apparatus corresponding to at least one of embodiments of the present invention. A computer apparatus 1 includes at least a first action execution unit 111, a first parameter changing unit 112, a second action selection unit 113, a second action execution unit 114, and a game progressing unit 115.

The first action execution unit 111 has a function of causing an object to execute a first action by a player's operation. The first parameter changing unit 112 has a function of changing a first parameter with the passage of time. The second action selection unit 113 has a function of selecting a second action to be executed from among a plurality of second actions by the player's operation. The second action execution unit 114 has a function of causing the object to execute the selected second action by the player's operation in a case where the first parameter satisfies a predetermined first condition. The game progressing unit 115 has a function of causing a game to progress in response to execution of the first action and the second action.

Figure 4:
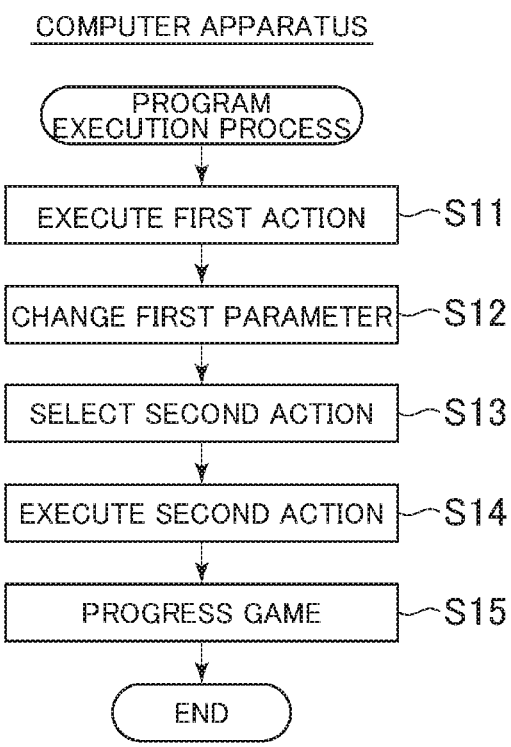
FIG. 4 is a flowchart illustrating a program execution process corresponding to at least one of embodiments of the present invention.

Next, a description will be made of a program execution process in the second embodiment of the present invention. FIG. 4 is a flowchart illustrating a program execution process corresponding to at least one of embodiments of the present invention.

The computer apparatus 1 causes an object to execute a first action by a player's operation (step S11). The computer apparatus 1 changes a first parameter with the passage of time (step S12). The computer apparatus 1 selects a second action to be executed from among a plurality of second actions by the player's operation (step S13).

The computer apparatus 1 causes the object to execute the selected second action by the player's operation in a case where the first parameter satisfies a predetermined first condition (step S14). Next, the computer apparatus 1 causes a game to progress in response to execution of the first action and the second action (step S15), and terminates the process.

As one aspect of the second embodiment, a second action to be executed can be selected from a plurality of second actions, and thus the amusement of a game is improved.

In the second embodiment, the "computer apparatus", the "object", the "first action", the "first parameter", the "first condition", and the "second action" may respectively employ the contents described in the first embodiment within a necessary scope. In the second embodiment, the term "selection" means that, for example, a second action to be executed is specified from options of a plurality of second actions.

Third Embodiment

Figure 5:
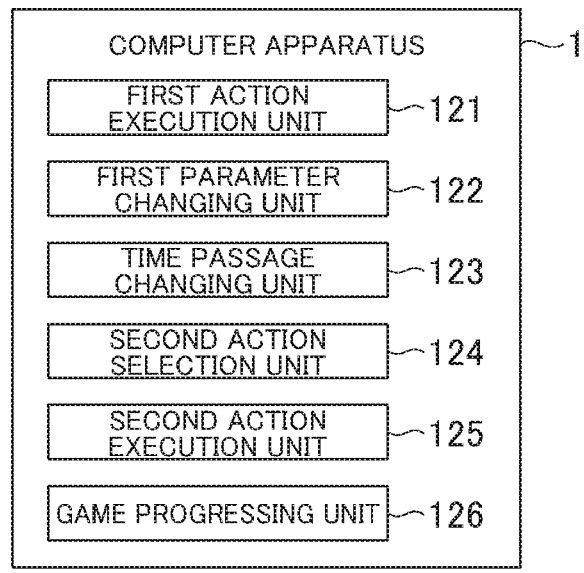
FIG. 5 is a block diagram illustrating a configuration of a computer apparatus corresponding to at least one of embodiments of the present invention.

Next, a description will be made of an outline of a third embodiment of the present invention. FIG. 5 is a block diagram illustrating a configuration of a computer apparatus corresponding to at least one of embodiments of the present invention. A computer apparatus 1 includes at least a first action execution unit 121, a first parameter changing unit 122, a time passage changing unit 123, a second action selection unit 124, a second action execution unit 125, and a game progressing unit 126.

The first action execution unit 121 has a function of causing an object to execute a first action by a player's operation. The first parameter changing unit 122 has a function of changing a first parameter with the passage of time. The time passage changing unit 123 has a function of delaying the passage of time in a game while the second action selection unit 124 selects a second action. The second action selection unit 124 has a function of selecting a second action to be executed from among a plurality of second actions by the player's operation. The second action execution unit 125 has a function of causing the object to execute the selected second action by the player's operation in a case where the first parameter satisfies a predetermined first condition. The game progressing unit 126 has a function of causing a game to progress in response to execution of the first action and the second action.

Figure 6:
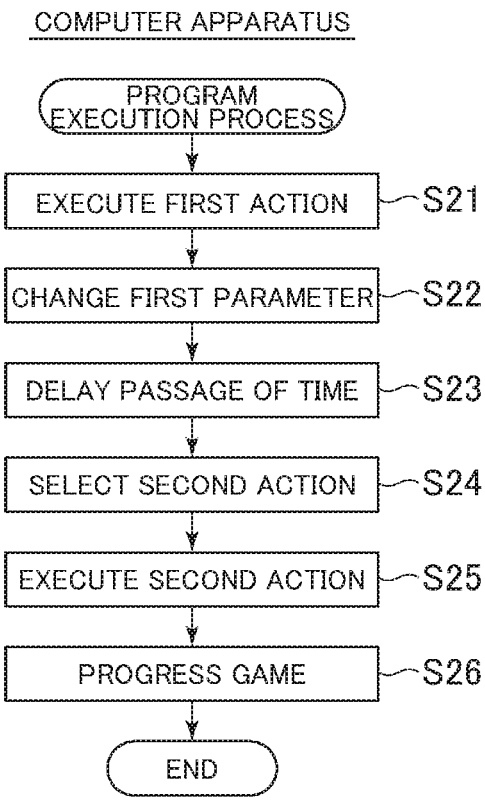
FIG. 6 is a flowchart illustrating a program execution process corresponding to at least one of embodiments of the present invention.

Next, a description will be made of a program execution process in the third embodiment of the present invention. FIG. 6 is a flowchart illustrating a program execution process corresponding to at least one of embodiments of the present invention.

The computer apparatus 1 causes an object to execute a first action by a player's operation (step S21). The computer apparatus 1 changes a first parameter with the passage of time (step S22). The computer apparatus 1 delays the passage of time in a game while a second action is selected (step S23). The computer apparatus 1 selects a second action to be executed from among a plurality of second actions by the player's operation (step S24). The computer apparatus 1 causes the object to execute the selected second action by the player's operation in a case where the first parameter satisfies a predetermined first condition (step S25). Next, the computer apparatus 1 causes the game to progress in response to execution of the first action and the second action (step S26), and terminates the process.

As one aspect of the third embodiment, since the passage of time in a game is delayed while a second action to be executed is selected from among a plurality of second actions, the game progresses without time stopping, and it is also possible to secure the time required to examine which second action is to be executed.

In the third embodiment, the "computer apparatus", the "object", the "first action", the "first parameter", the "first condition", the "second action", and the term "selection" may respectively employ the contents described in the second embodiment within a necessary scope. In the third embodiment, the phrase "while a second action is selected" means, for example, a period after options of a plurality of second actions are displayed on a display screen until at least one second action is specified from the options by a player's operation.

Fourth Embodiment

Figure 7:
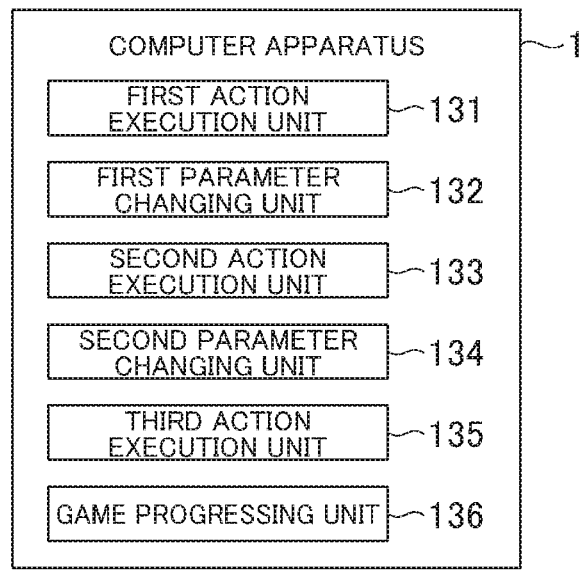
FIG. 7 is a block diagram illustrating a configuration of a computer apparatus corresponding to at least one of embodiments of the present invention.

Next, a description will be made of an outline of a fourth embodiment of the present invention. A description will be made of an outline of a fourth embodiment of the present invention. FIG. 7 is a block diagram illustrating a configuration of a computer apparatus corresponding to at least one of embodiments of the present invention. A computer apparatus 1 includes at least a first action execution unit 131, a first parameter changing unit 132, a second action execution unit 133, a second parameter changing unit 134, a third action execution unit 135, and a game progressing unit 136.

A game executes a virtual battle between an object and an opponent object. The first action execution unit 131 has a function of causing the object to execute a first action by a player's operation. The first parameter changing unit 132 has a function of changing a first parameter with the passage of time. The second action execution unit 133 has a function of causing the object to execute a second action by the player's operation in a case where the first parameter satisfies a predetermined first condition. The second parameter changing unit 134 has a function of changing a second parameter in response to the object executing a predetermined action on the opponent object and/or the object receiving a predetermined action from the opponent object in the virtual battle. The third action execution unit 135 has a function of causing the object to execute a third action in a case where the second parameter satisfies a predetermined second condition. The game progressing unit 136 has a function of causing the game to progress in response to execution of the first action, the second action, and the third action.

Figure 8:
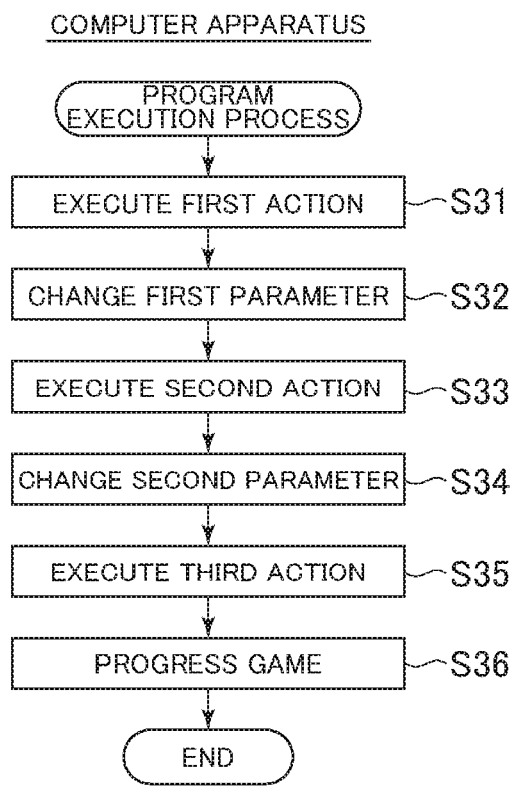
FIG. 8 is a flowchart illustrating a program execution process corresponding to at least one of embodiments of the present invention.

Next, a description will be made of a program execution process in the fourth embodiment of the present invention. FIG. 8 is a flowchart illustrating a program execution process corresponding to at least one of embodiments of the present invention.

The computer apparatus 1 causes an object to execute a first action by a player's operation (step S31). The computer apparatus 1 changes a first parameter with the passage of time (step S32). The computer apparatus 1 causes the object to execute a second action by the player's operation in a case where the first parameter satisfies a predetermined first condition (step S33). The computer apparatus 1 changes a second parameter in response to the object executing a predetermined action on an opponent object and/or the object receiving a predetermined action from the opponent object in a virtual battle (step S34). The computer apparatus 1 causes the object to execute a third action in a case where the second parameter satisfies a predetermined second condition (step S35). Next, the computer apparatus 1 causes a game to progress in response to execution of the first action, the second action, and the third action (step S36), and terminates the process.

As one aspect of the fourth embodiment, the third action can be executed in response to an object executing a predetermined action on an opponent object or the object receiving a predetermined action from the opponent object, and thus strategic performance required for a player is increased such that the amusement of a game is improved.

In the fourth embodiment, the "computer apparatus", the "object", the "first action", the "first parameter", the "first condition", and the "second action" may respectively employ the contents described in the first embodiment within a necessary scope.

In the fourth embodiment, the "opponent object" means, for example, an object performing a battle with an object operated by a player or an object serving as an ally of the player in a game. The "virtual battle" means that, for example, an object and an opponent object perform a battle with each other in a game. The "predetermined action" is not particularly limited as long as the action can be executed on an opponent object by an object or the action can be executed on the object by the opponent object, and may include, for example, an attack using a weapon or bare hands.

The "second parameter" means a parameter that is increased or decreased in response to, for example, a character operated by a player executing a predetermined action such as an attack on an opponent character or the character operated by the player receiving a predetermined action such as an attack from the opponent character. The "second condition" is, for example, a condition in which an object can be caused to execute a third action, and may be a condition in which, for example, the second parameter is equal to or more than a predetermined threshold value. The "third action" is not particularly limited as long as the action can be executed by an object, and may include an action of performing a special attack or a special spell stronger than in a normal time on an opponent object unlike the first action and the second action. The "third action" may be the same as the first action or the second action.

Fifth Embodiment

Figure 9:
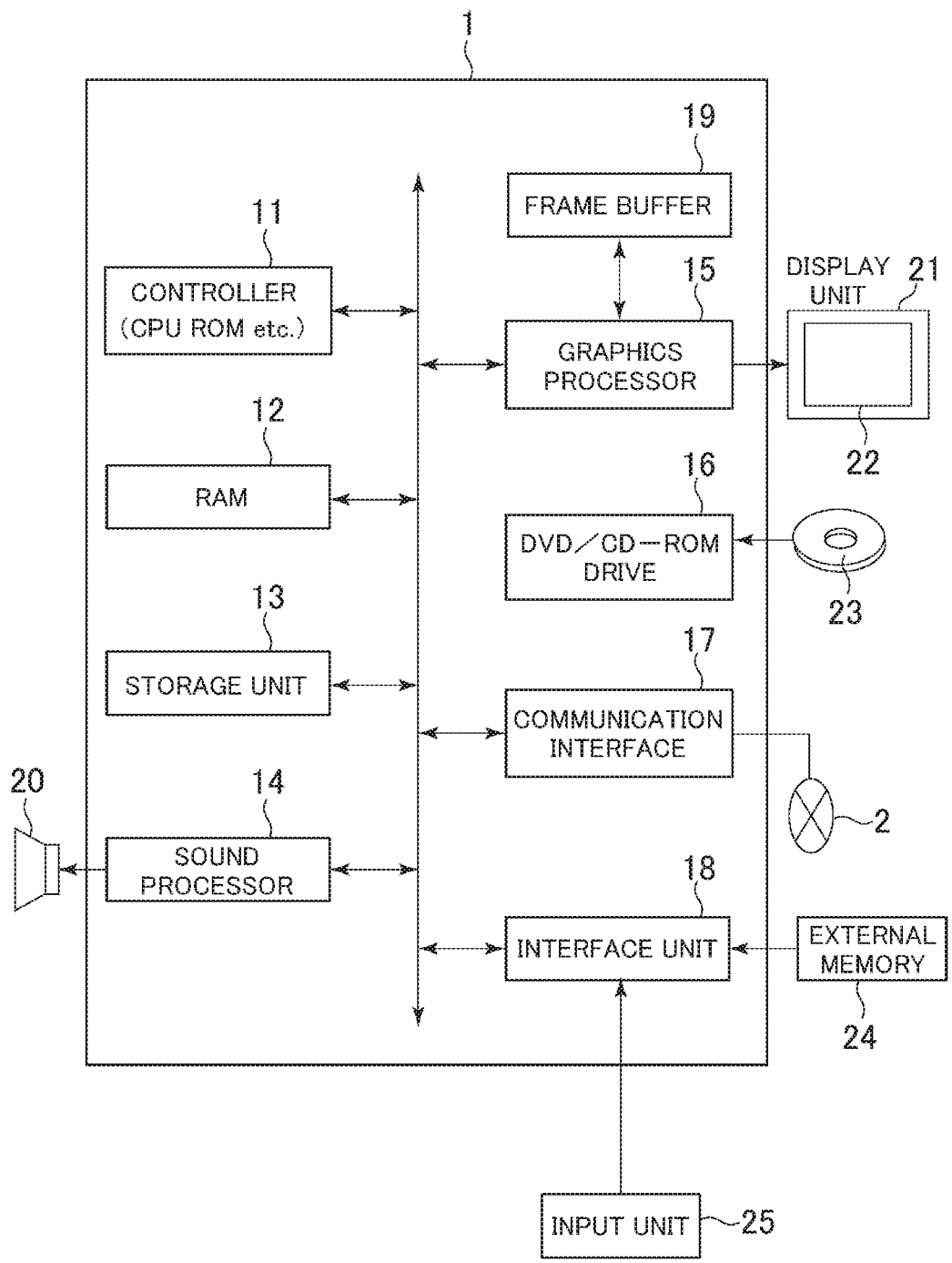
FIG. 9 is a block diagram illustrating a configuration of a computer apparatus corresponding to at least one of embodiments of the present invention.

Next, a description will be made of an outline of a fifth embodiment of the present invention. FIG. 9 is a block diagram illustrating a configuration of a computer apparatus corresponding to at least one of embodiments of the present invention. A computer apparatus 1 includes a controller 11, a random access memory (RAM) 12, a storage 13, a sound processor 14, a graphics processor 15, a DVD/CD-ROM drive 16, a communication interface 17, and an interface unit 18, which are connected to each other via internal buses.

A central processing unit (CPU) or a read only memory (ROM) constitutes the controller 11. The controller 11 executes a program stored in the storage unit 13 and controls the computer apparatus 1. The RAM 12 is the work area of the controller 11. The storage unit 13 is a storage region for storing a program or data.

The controller 11 performs a process by reading the program and the data from the RAM 12. The controller 11 processes the program and the data loaded into the RAM 12 so as to output a sound output instruction to the sound processor 14 and a drawing command to the graphics processor 15.

The sound processor 14 is connected to a sound output device 20, which is a speaker. When the controller 11 outputs the sound output instruction to the sound processor 14, the sound processor 14 outputs a sound signal to the sound output device 20.

The graphics processor 15 is connected to a display unit 21. The display unit 21 includes a display screen 22. When the controller 11 outputs the drawing command to the graphics processor 15, the graphics processor 15 deploys an image in a frame memory (frame buffer) 19 and outputs a video signal for displaying an image on the display screen 22.

The graphics processor 15 performs the drawing of one image in units of frames. A time for one frame of an image is, for example, 1/30 seconds. The graphics processor 15 takes charge of a portion of a calculation process related to a drawing process, which has been performed by only the controller 11, and the graphics processor 15 has a role for load distribution over the entire system.

The DVD/CD-ROM drive 16 is installable with a recording medium 23 such as a DVD-ROM or a CD-ROM in which a game program is stored. A program and data for executing a game in a video game apparatus are stored in the recording medium 23, and the program and the data are read by the DVD/CD-ROM drive 16 to be loaded to the RAM 12.

The interface unit 18 may be connected to an external memory 24 (for example, an SD card) and an input unit 25. The data read from the external memory 24 and input information that is input via the input unit 25 are loaded to the RAM 12, and thus a calculation process is executed by the controller 11.

The communication interface 17 can be connected to a communication network 2 in a wireless or wired manner and can receive data via the communication network 2. The data received via the communication interface 17 is load to the RAM 12, and thus a calculation process is executed by the controller 11.

Figure 10:
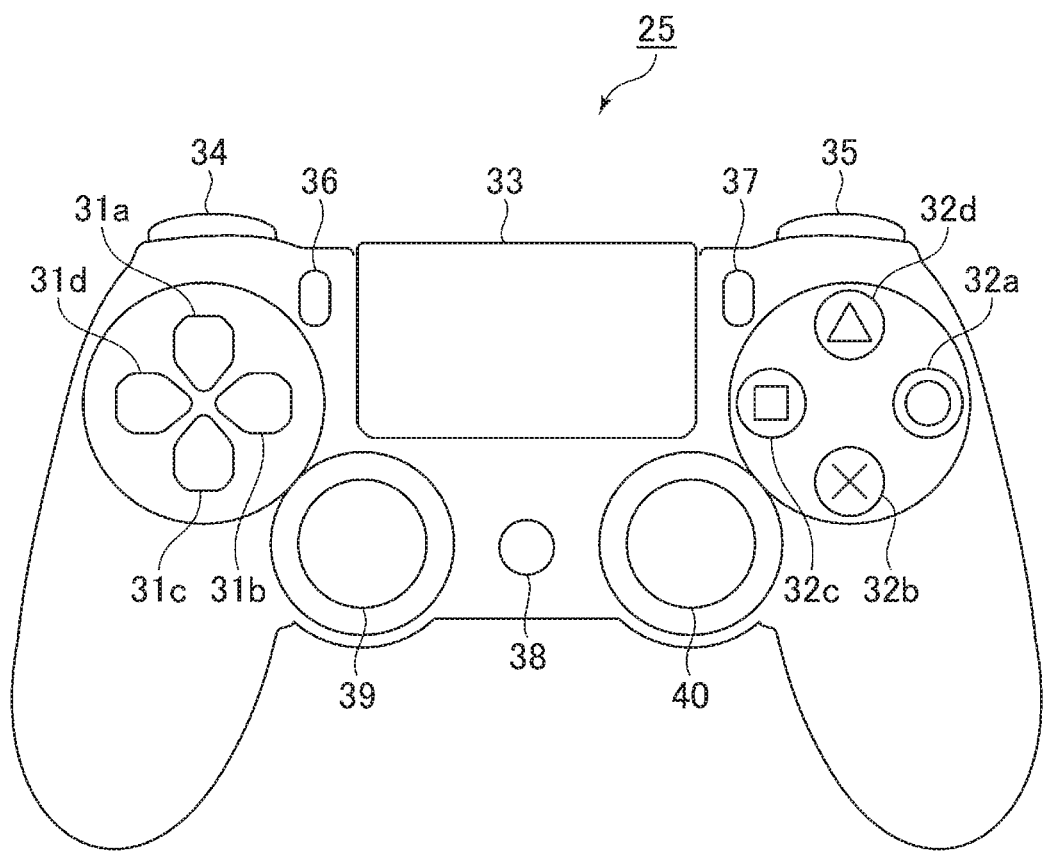
FIG. 10 is a diagram illustrating a configuration of the input unit corresponding to at least one of embodiments of the present invention.

FIG. 10 is a diagram illustrating a configuration of the input unit corresponding to at least one of embodiments of the present invention. A cross key 31 is provided on a front left side of the input unit 25, and a button group 32 is provided on a front right side thereof. The cross key 31 includes an upward key 31a, a rightward key 31b, a downward key 31c, and a leftward key 31d, and the button group 32 includes a O button 32a, a X button 32b, a □ button 32c, and a Δ button 32d. A pad button 33 is provided in a central portion of the input unit 25, a share button 36 is provided on the left side of the pad button 33, an option button 37 is provided on the right side thereof, and a start button 38 is provided at the center thereunder. A plurality of buttons such as an L button 34 and an R button 35 are provided on a side portion of the input unit 25. A joystick 39 is provided on the front left side of the input unit 25, that is, the lower right side of the cross key 31, and a joystick 40 is provided on the front right side of the input unit 25, that is, the lower left side of the button group 32.

In a case where pressing force is applied to each of the cross key 31, the button group 32, the pad button 33, the L button 34, the R button 35, the share button 36, the option button 37, and the start button 38, a corresponding switch is turned on. A detection signal corresponding to turning-on or turning-off of the switch is generated in the input unit 25, and the detection signal is supplied to the RAM 12 via the interface unit 18. A detection signal corresponding to inclination azimuths of the joystick 39 and the joystick 40 is generated in the input unit 25, and the detection signal is similarly supplied to the RAM 12 via the interface unit 18.

Hereinafter, a description will be made of a case where a game program corresponding to at least one of embodiments of the present invention is applied to an action RPG. A player character may be moved on a field in a virtual space. When the player character encounters an opponent character on the field, a virtual battle between the player character and the opponent character is started. The virtual battle progresses in real time with the passage of time. In order for the virtual battle to be caused to progress advantageously, the player character may come close to the opponent character or may become distant from the opponent character depending on situations.

A hit point (HP) indicating a residual quantity of physical strength is set for each of the player character and the opponent character, and, when an HP becomes zero due to an attack or the like of a character of the other party, a character is brought into a battle impossible state. When an HP of the opponent character becomes zero, the player character wins the virtual battle, and the player character acquires an experience value and currency in the game. On the other hand, when an HP of the player character becomes zero, the player character is brought into a battle impossible state, the game may be over, or, in a case where a player can operate a plurality of player characters, the player may continue the virtual battle by operating remaining player characters.

Buttons of the input unit 25 and a method of operating the joysticks described below are only examples, and a player may change settings of the buttons and the joysticks, and actions corresponding thereto, as appropriate.

The player may move a player character on a field in a virtual space by operating the joystick 39. The player may control a position or a direction of a virtual camera by operating the joystick 40.

In the virtual battle, in a case where the player presses the □ button 32c, close range attacks can be performed with a weapon such as a sword. In a case where the □ button 32c is pressed for a long time, ranged attacks can be continuously made with a gun or the like. Here, an attack action executed by the player character when the □ button 32c is pressed corresponds to, for example, the first action.

The player character may take an avoidance behavior for an attack of the opponent character. When the player presses the O button 32a, the player character may be moved in any of an upward direction, a downward direction, a rightward direction, and a leftward direction to take an avoidance behavior. Here, the avoidance behavior executed by the player character when the O button 32a is pressed also corresponds to, for example, the first action.

The player may press the R button 35 such that the player character takes a defensive measure. In a case where an attack of the opponent character is received when the defensive measure is taken, an HP is reduced, but a reduction amount of the HP is smaller than in a case where an attack of the opponent character is received when the defensive measure is not taken. Here, the defensive behavior executed by the player character when the R button 35 is pressed also corresponds to, for example, the first action.

The player may operate a plurality of characters through switching thereamong. The upward key 31a and the downward key 31c of the cross key 31 may be pressed such that a character that is being operated is switched to another character.

In a case where the player presses the X button 32b, a command menu is displayed, and transition to a tactical mode occurs. In the tactical mode, an action to be executed by the player character may be selected from a plurality of commands. The tactical mode is continued after the command menu is displayed until a command is selected such that the command menu is closed.

In the tactical mode, the passage of time in a game is delayed. More specifically, movements or speeds of actions of the player character, an automatically controlled character serving as an ally of the player character, and the opponent character become slow or are reduced. As will be described later, in a case where a predetermined parameter is increased with the passage of time, a speed at which the parameter is increased is also reduced.

Three commands such as an "ability", a "spell", and an "item" are displayed in the command menu. The player may designate a command by operating the cross key 31 or the joystick 39, and may select an action (corresponding to the second action) to be executed by the player character by pressing the O button 32a.

However, as will be described later, in a case where a limit gauge is accumulated (in a case where a limit parameter reaches a predetermined threshold value or is equal to or more than the predetermined threshold value), a command such as a "limit break" is displayed in a special aspect that is different from those of the other commands in addition to the three commands such as the "ability", the "spell", and the "item" in the command menu. The player may designate the "limit break" by operating the cross key 31 or the joystick 39, and may select the limit break (corresponding to the third action) by pressing the O button 32a.

Figure 11:
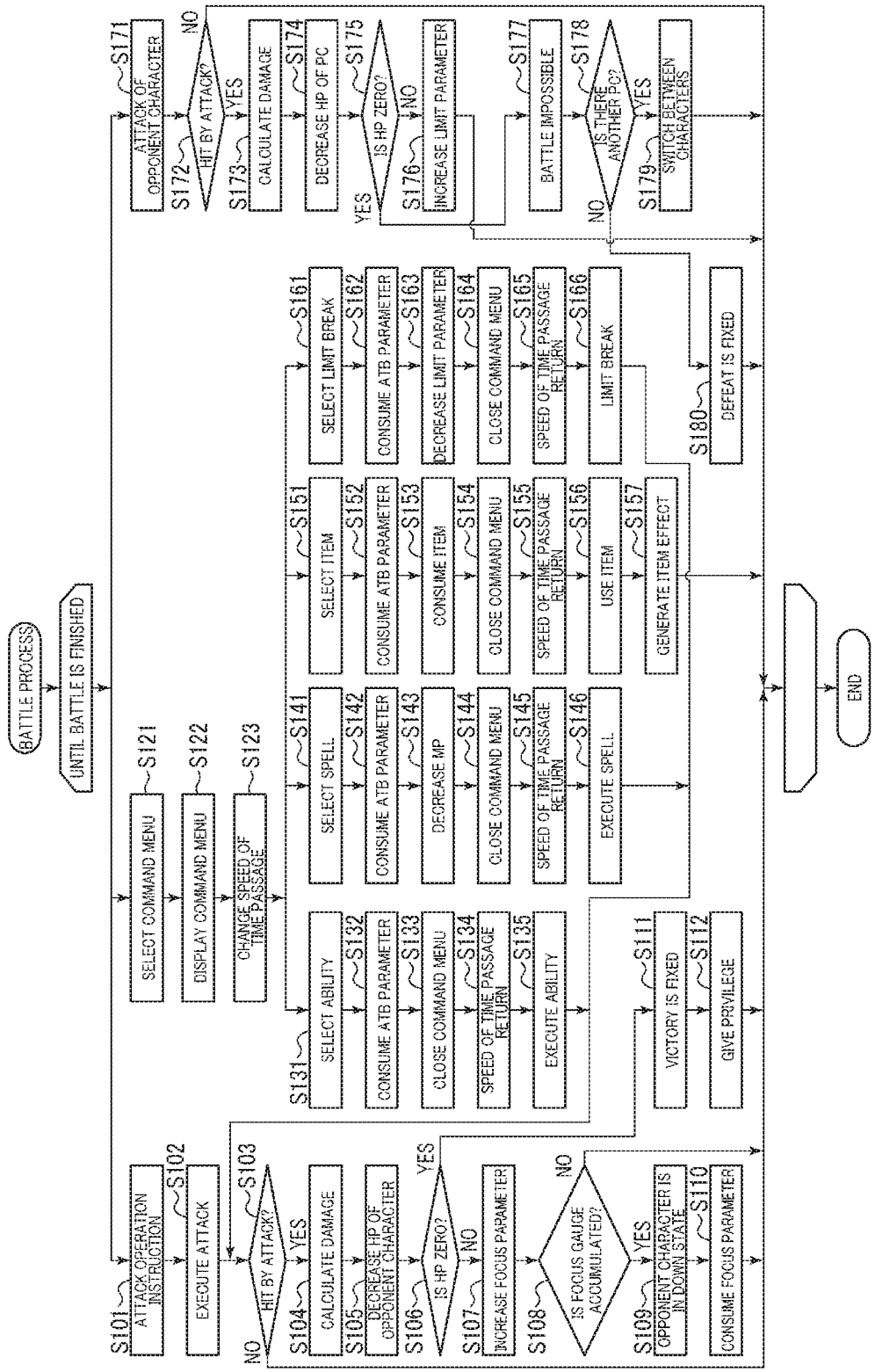
FIG. 11 is a flowchart illustrating a battle process corresponding to at least one of embodiments of the present invention.

Next, a description will be made of a program execution process in the sixth embodiment of the present invention. FIG. 11 is a flowchart illustrating a battle process corresponding to at least one of embodiments of the present invention. In a case where there is an attack operation instruction from a player (step S101), an attack action is executed (step S102). The attack action is an example of the "first action". It is determined whether or not the attack has hit an opponent character by determining whether or not a weapon or a bullet of a pistol of a player character has collided with the opponent character (step S103).

In a case where it is determined that the attack has not hit the opponent character (No in step S103), a battle is not finished, and all or some of the processes in steps S101 to S179 are repeatedly executed until a victory or defeat of the player character is fixed and thus the battle is finished.

On the other hand, in a case where it is determined that the attack has hit the opponent character (Yes in step S103), damage to the opponent character is calculated (step S104). The damage is calculated on the basis of attack power of the player character, defensive power of the opponent character, and the like. Next, the calculated damage is subtracted from a hit point (HP) that is a physical strength value of the opponent character, and thus a residual HP of the opponent character is calculated (step S105).

In a case where the HP of the opponent character becomes "0" (or equal to or less than 0) (Yes in step S106), the opponent character cannot execute the battle, and thus a victory of the player character is fixed (step S111). Privileges such as an experience value, currency in the game, and items are given to the player character (step S112). The victory of the player character is fixed, and thus the battle process is terminated.

In a case where the HP of the opponent character is not "0" (or not equal to or less than 0) (No in step S106), a focus parameter set for each opponent character is increased (step S107). For example, a predetermined value is added to the focus parameter when an attack made by the player character or an automatically controlled character serving as an ally of the player character hits the opponent character. A value of the focus parameter that is increased through a single attack may be set to differ according to the type of attack or attack power of the player character.

The focus parameter may be increased from 0 to an upper limit value (for example, 100). The current value of the focus parameter is displayed by a focus gauge on a display screen. The player may check the focus gauge so as to check how soon the focus parameter reaches the upper limit value.

In a case where the focus parameter reaches the upper limit value due to the increase of the focus parameter, and the focus gauge is accumulated (YES in step S108), a special effect is generated in the game (step S109). The parameter may return to 0 by consuming the focus parameter having reached the upper limit value after the special effect is generated (step S110). The focus parameter reaching the upper limit value is an example of the "third condition".

A special effect generated due to the focus parameter reaching the upper limit value is not particularly limited, and may be not only an effect advantageous to the player character but also an effect disadvantageous to the player character and advantageous to the opponent character.

The effect advantageous to the player character may include an effect in which the opponent character is brought into a down state. In a case where the opponent character is in the down state, the opponent character may not execute an action such as an attack until the down state is canceled after a predetermined time elapses. In a case where an attack made by the player character hits the opponent character during the down state of the opponent character, damage greater than damage in a normal state can be caused to the opponent character in the down state.

The effect disadvantageous to the player character and advantageous to the opponent character may include an effect in which the opponent character is brought into an out-of-control state or an enhanced state. In a case where the opponent character is in the out-of-control state, the opponent character does not use a spell or an item, but the attack power of the opponent character is considerably increased. In a case where the opponent character in the enhanced state, statuses of attack power, quickness, defensive power, and magical power of the opponent character are increased. The out-of-control state or the enhanced state is canceled when a predetermined time elapses after the opponent character is brought into the out-of-control state or the enhanced state.

In step S106, in a case where it is determined that the focus parameter does not reach the upper limit value (No in step S106), the battle is not finished, and all or some of the processes in steps S101 to S179 are repeatedly executed until a victory or defeat of the player character is fixed and thus the battle is finished.

Next, in a case where there is an operation instruction for selecting a command menu from the player (step S121), a window for displaying the command menu is opened (step S122). When the command menu is displayed, a process of changing a speed of time passage in the game is performed (step S123). The speed of time passage in the game is reduced more than before the command menu is selected, and thus the player can take time to select a command.

When the ability is selected from among a plurality of commands displayed in the window of the command menu (step S131), an ATB point required to execute the selected ability is consumed from an ATB point that the player character has at that time (step S132). The ability displayed as an option may be one or plural. Values of consumed ATB points may be different from each other depending on the type of ability. The ability is an example of the "second action", and having an ATB point required to execute the ability is an example of the "first condition".

Next, the window displaying the command menu is closed (step S133), a speed of time passage in the game returns to the same speed as the speed before the command menu is selected (step S134). The ability selected in step S131 is executed (step S135). In a case where the selected ability is an ability of a type of attacking the opponent character, the flow proceeds to step S103, and processes in steps S103 to S112 are executed.

In a case where the selected ability is not an ability of a type of attacking the opponent character (for example, an ability of a type of reducing a status of the opponent character, an ability of a type of increasing a status of the player character, or an ability of a type of recovering an HP of the player character), the flow does not proceed to step S103 after step S135, and an effect of the ability is generated. After the effect of the ability is generated, the battle is not finished, and all or some of the processes in steps S101 to S179 are repeatedly executed until a victory or defeat of the player character is fixed and thus the battle is finished.

When the spell is selected from the plurality of commands displayed in the window of the command menu (step S141) after step S123, an ATB point required to execute the selected spell is consumed from an ATB point that the player character has at that time (step S142).

The spell displayed as an option may be one or plural. Values of consumed ATB points may be different from each other depending on the type of spell. Next, a magic point (MP) required to execute the selected spell is consumed from an MP that the player character has at that time (step S143). Values of consumed MPs may be different from each other depending on the type of spell.

The spell is an example of the "second action", and having an ATB point required to execute the spell is an example of the "first condition".

Next, the window displaying the command menu is closed (step S144), a speed of time passage in the game returns to the same speed as the speed before the command menu is selected (step S145). The spell selected in step S141 is executed (step S146). In a case where the selected spell is a spell of a type of attacking the opponent character, the flow proceeds to step S103, and the processes in steps S103 to S112 are executed.

In a case where the selected spell is not a spell of a type of attacking the opponent character (for example, a spell of a type of reducing a status of the opponent character, a spell of a type of increasing a status of the player character, or a spell of a type of recovering an HP of the player character), the flow does not proceed to step S103 after step S15, and an effect of the spell is generated. After the effect of the spell is generated, the battle is not finished, and all or some of the processes in steps S101 to S179 are repeatedly executed until a victory or defeat of the player character is fixed and thus the battle is finished.

When the use of an item is selected from the plurality of commands displayed in the window of the command menu (step S151) after step S123, an ATB point required to use the selected item is consumed from an ATB point that the player character has at that time (step S152). The item displayed as an option may be one or plural. Values of consumed ATB points may be different from each other depending on the type of item used. Next, the selected item is consumed (step S153). The item displayed as an option may be one or plural.

The use of an item is an example of the "second action", and having an ATB point required to use the item is an example of the "first condition".

Next, the window displaying the command menu is closed (step S154), a speed of time passage in the game returns to the same speed as the speed before the command menu is displayed (step S155). The item selected in step S151 is used (step S156), and an effect of the item is generated (step S157).

The effect of an item differs depending on the type of item. Items may include, for example, an item of a type of reducing a status of the opponent character, an item of a type of increasing a status of the player character, and an item of a type of recovering an HP of the player character. After the effect of the item is generated, the battle is not finished, and all or some of the processes in steps S101 to S179 are repeatedly executed until a victory or defeat of the player character is fixed and thus the battle is finished. In a case where the used item is an item of a type of attacking the opponent character, the flow proceeds to step S103, and processes in steps S103 to S112 are executed.

When the limit break is selected from the plurality of commands displayed in the window of the command menu (step S161) after step S123, an ATB point required to execute the selected limit break is consumed from an ATB point that the player character has at that time (step S162). Next, a limit point required to execute the selected limit break is consumed (step S163).

Next, the window displaying the command menu is closed (step S164), a speed of time passage in the game returns to the same speed as the speed before the command menu is selected (step S165). The limit break is executed (step S166). The limit break is to attack the opponent character with power considerably greater than in a normal time. After the limit break is executed, the flow proceeds to step S103, and the processes in steps S103 to S112 are executed.

The limit break is an example of the "third action", and having a limit point required to execute the limit break is an example of the "second condition".

In the battle, the player character attacks the opponent character, and the opponent character also attacks the player character (step S171). It is determined whether or not an attack has hit the player character by determining whether or not a body of the opponent character such as an arm, a leg, or a tail collides with the player character (step S172).

In a case where it is determined that the attack has not hit the player character (No in step S172), the battle is not finished, and all or some of the processes in steps S101 to S179 are repeatedly executed until a victory or defeat of the player character is fixed and thus the battle is finished.

On the other hand, in a case where it is determined that the attack has hit the player character (Yes in step S172), damage to the player character is calculated (step S173). The damage is calculated on the basis of attack power and the opponent character, defensive power of the player character, and the like. Next, the calculated damage is subtracted from a hit point (HP) that is a physical strength value of the player character, and thus a residual HP of the player character is calculated (step S174).

In a case where the HP of the player character becomes "0" (or equal to or less than 0) (Yes in step S175), the player character cannot execute the battle (step S177). In a case where there is another automatically controlled character serving as an ally of the player character (Yes in step S178), the battle is continued by the player operating the automatically controlled character. In other words, switching between player characters occurs (step S179). In a case where the switching between player characters occurs, the battle is not finished, and all or some of the processes in steps S101 to S179 are repeatedly executed until a victory or defeat of the player character is fixed and thus the battle is finished.

In a case where the HP of the player character becomes "0" (or equal to or less than 0) and there is no other automatically controlled character serving as an ally of the player character (No in step S178), defeat of the player character is fixed (step S180), and the game is over.

In a case where the HP of the player character is not "0" (or not equal to or less than 0) (No in step S175), a limit parameter set for the player character is increased (step S176). In a case where the limit parameter is increased, the battle is not finished, and all or some of the processes in steps S101 to S179 are repeatedly executed until a victory or defeat of the player character is fixed and thus the battle is finished.

For example, a predetermined value is added to the limit parameter when an attack made by the player character hits the opponent character. A predetermined value may be added to the limit parameter when an attack made by the opponent character hits the player character. A value of the limit parameter that is increased through a single attack may be set to differ according to the type of attack or attack power of a character.

The limit parameter may be increased from 0 to an upper limit value (for example, 100). The current value of the limit parameter is displayed by a limit gauge on a display screen. The player may check the limit gauge so as to check how soon the limit parameter reaches the upper limit value. When the limit parameter reaches the upper limit value due to an increase of the limit parameter, the limit break is selected in step S161, the limit break is executed in step S166, and thus great damage may be caused to the opponent character. In a case where the limit break is executed, the entire limit parameter is consumed to return to 0.

Figure 12:
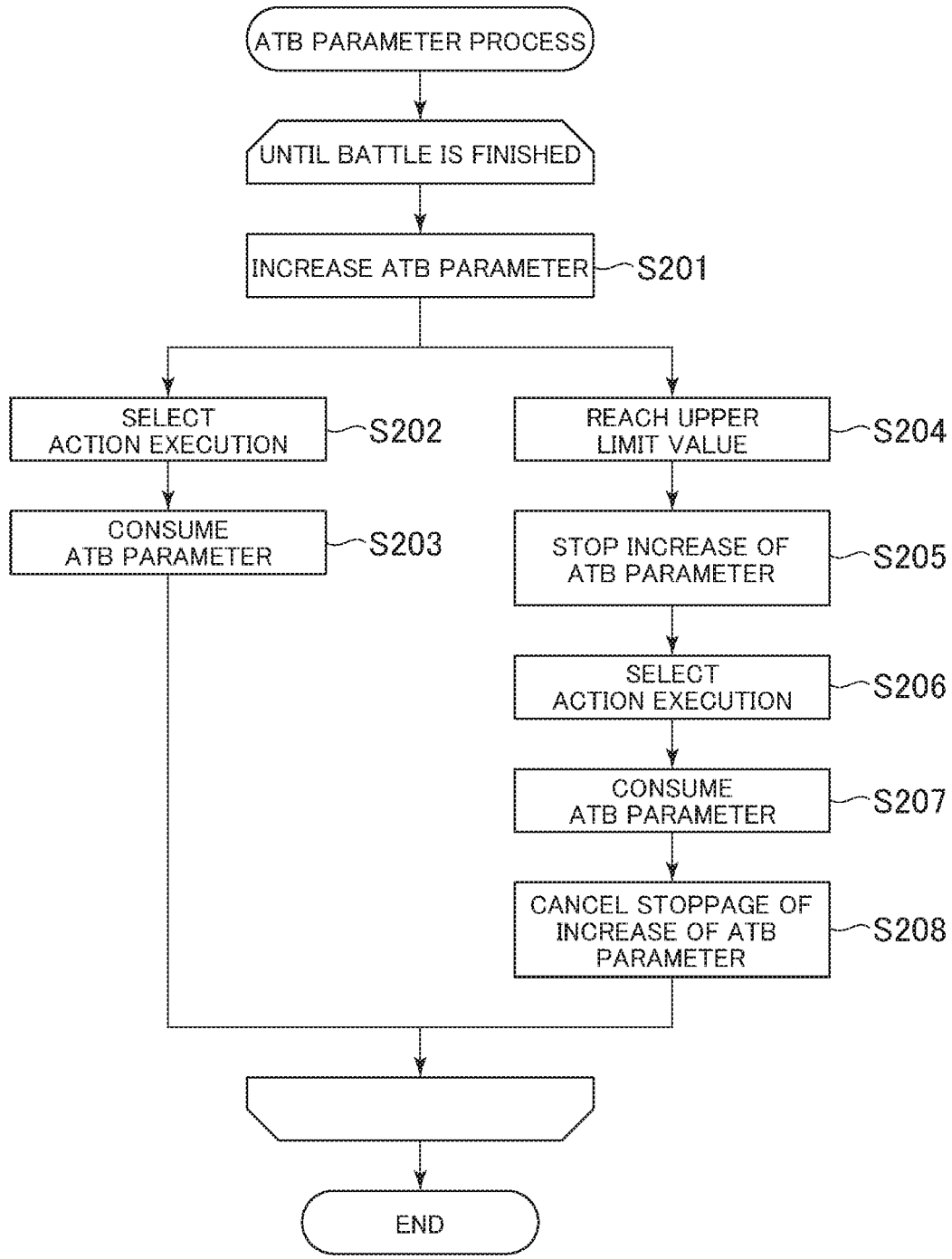
FIG. 12 is a flowchart illustrating an ATB parameter process corresponding to at least one of embodiments of the present invention.

FIG. 12 is a flowchart illustrating an ATB parameter process corresponding to at least one of embodiments of the present invention. In a case where a virtual battle is started, an ATB parameter is increased with the passage of time (step S201). The ATB parameter corresponds to the first parameter. The ATB parameter may be represented by integers from 0 to an upper limit value (for example, 100 points). The ATB is increased at a determined speed such as an increase of 1 point per second.

When execution of an action for which the ATB parameter is to be consumed, such as the ability, the spell, the item use, or the limit break is selected from the command menu by a user's operation (step S202), the ATB parameter required to execute the action is consumed (step S203), and the selected action is executed.

There may be a configuration in which, when execution of an action is selected in step S202, it is determined whether or not the ATB parameter required to execute the selected action is accumulated at that time. There may be a configuration in which, in a case where the ATB parameter is accumulated, the ATB parameter is consumed, and the action is executed, and in a case where the ATB parameter is not accumulated, an error is displayed.

There may be a configuration in which it is determined whether or not the ATB parameter required to execute an action is accumulated at that time with respect to each of commands as selection targets such as the ability, the spell, the item use, and the limit break, and only a command for which the ATB parameter is accumulated is displayed in the command menu. In a case where the ATB parameter is not accumulated, a command as a selection target is not displayed in the window although the window of the command menu is displayed. On the other hand, in a case where there is a command for which the ATB parameter required to execute an action is accumulated, the command is a display target in the window.

When the ATB parameter reaches the upper limit value due to an increase of the ATB parameter with the passage of time (step S204), the increase of the ATB parameter is stopped (step S205). When execution of an action for which the ATB parameter is to be consumed, such as the ability, the spell, the item use, or the limit break is selected from the command menu by the user's operation (step S206), the ATB parameter required to execute the action is consumed (step S207), and the selected action is executed. When the ATB parameter is consumed, the process of stopping the increase of the ATB parameter is canceled (step S208), and the ATB parameter is increased with the passage of time.

In addition to the ATB parameter being increased with the passage of time, the ATB parameter may be increased with the passage of time and may also be increased as a result of the player character attacking and damaging the opponent character.

All or some of the processes in steps S201 to S208 are repeatedly executed until a victory or defeat of the player character is fixed and thus the battle is finished.

Figure 13:
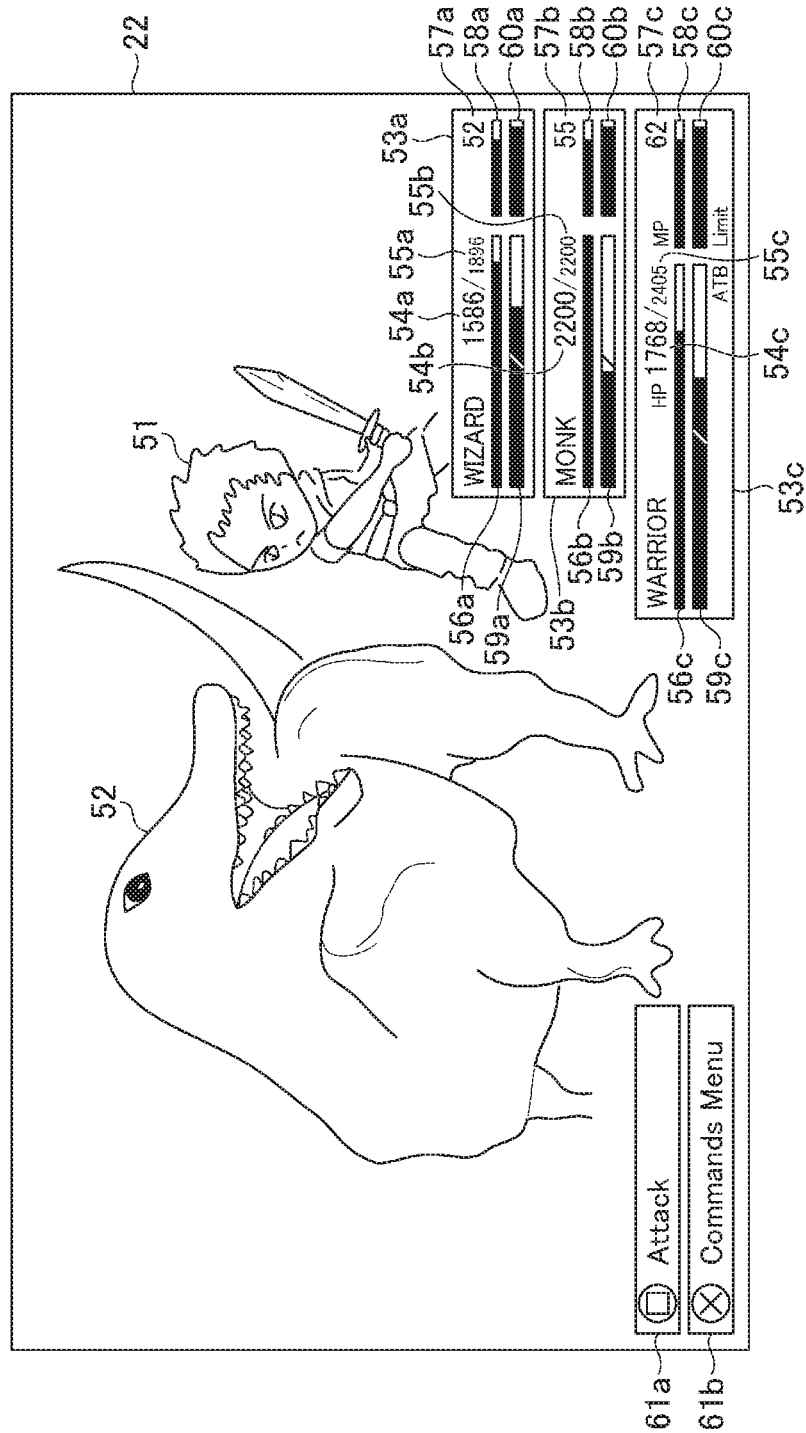
FIG. 13 is a diagram illustrating examples of program execution screens corresponding to at least one of embodiments of the present invention.
Figure 14:
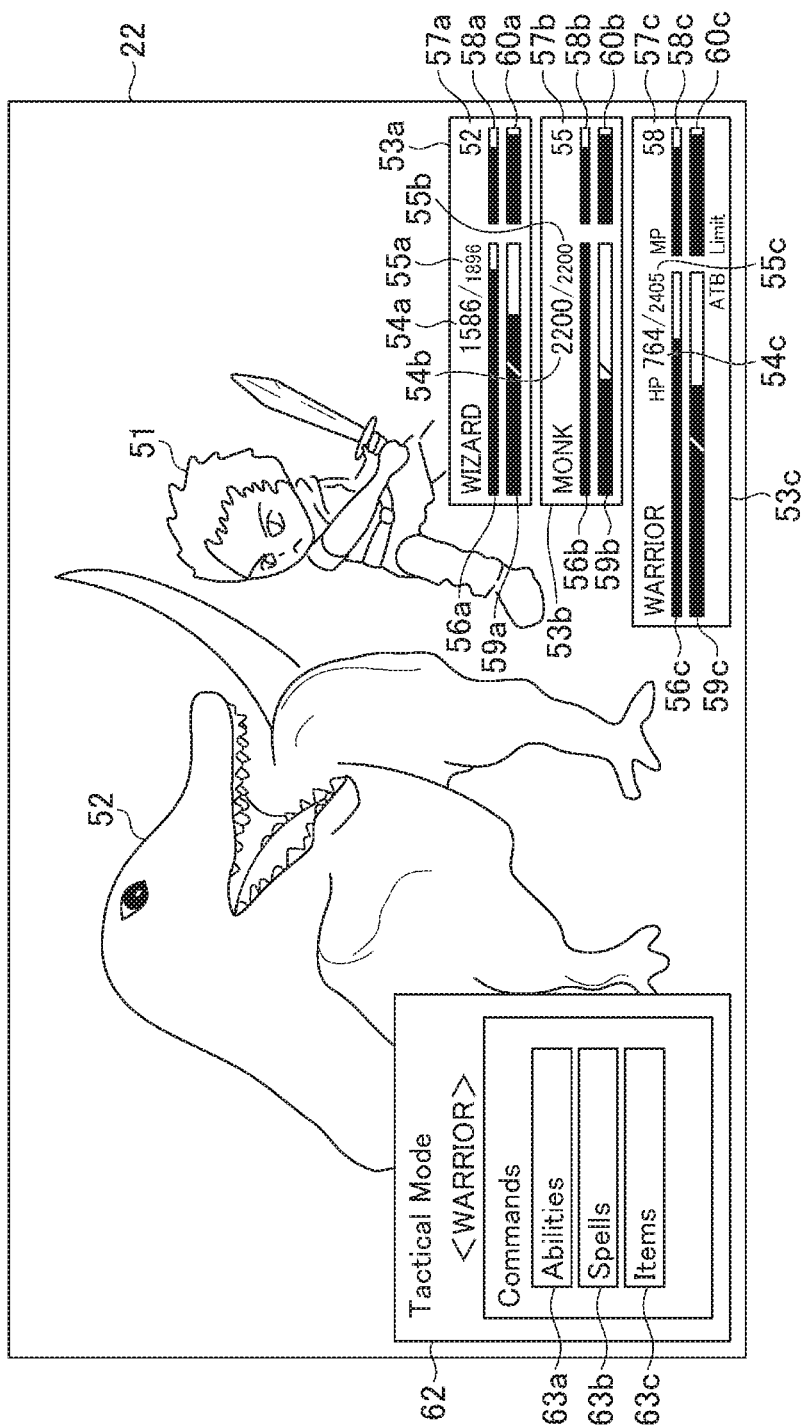
FIG. 14 is a diagram illustrating examples of program execution screens corresponding to at least one of embodiments of the present invention.

FIG. 13 and FIG. 14 are diagrams illustrating examples of program execution screens corresponding to at least one of embodiments of the present invention. In FIG. 13 and FIG. 14, a player character 51 and an opponent character 52 are displayed in the center of a display screen 24.

Status windows 53a to 53c are displayed on a lower right side of the display screen 22. Above all, the status window 53c that is located on the lowest side and has the largest area represents a status of the player character 51 that is currently operated by a player. The status windows 53a and 53b represent statuses of automatically controlled characters serving as allies of the player character 51, and, in a case where switching between player characters occurs, a status window 53 corresponding to a player character that is a new operation target is enlarged and displayed.

Hit points 54a to 54c and the maximum hit points 55a to 55c of the player character 51 and the automatically controlled characters serving as allies are displayed in the status windows 53a to 53c, and HP gauges 56a to 56c are displayed thereunder. Since a colored portion of the HP gauge 56 corresponds to the current hit point 54, when the HP 54 of the player character 51 is the same as the maximum HP 55, the entire HP gauge 56 is colored. On the other hand, in a case where the HP 54 of the player character 51 becomes "0", the colored portion of the HP gauge 56 disappears, and thus the entire gauge is filled in white.

Magic points 57a to 57c and MP gauges 58a to 58c are displayed in the status windows 53a to 53c. In a case where the player character 51 uses a spell, a numerical value displayed in the magic point 57 is reduced according to the used spell, and a boundary of a colored portion of the MP gauge 58 is moved leftward.

The ATB gauges 59a to 59c are displayed in the status windows 53a to 53c. Since a colored portion of each of the ATB gauges 59a to 59c corresponds to the current ATB parameter, in a case where the ATB parameter is increased with the passage of time, a boundary of each colored portion of the ATB gauges 59a to 59c is moved rightward in accordance therewith. Each of the ATB gauges 59a to 59c is partitioned into two regions by a diagonal line provided at the center thereof. Here, the gauge is partitioned into two regions, but may be partitioned into a plurality of (two or more) regions.

In a case where the ATB parameter is consumed, and an action such as an ability, a spell, or an item is executed, the ATB parameter corresponding to one region or two regions of the ATB gauge 59 is consumed. As mentioned above, since there is a configuration in which the ATB parameter corresponding to regions into which the ATB gauge is equally divided is consumed, and an action is executed, a player can easily recognize whether or not a predetermined action is in a state of being able to be executed and how soon the predetermined action can be executed.

Limit gauges 60a to 60c are displayed in the status windows 53a to 53c. Since a colored portion of each of the limit gauges 60a to 60c corresponds to the current limit parameter, in a case where the limit parameter is increased, a boundary of each colored portion of the limit gauges 60a to 60c is moved rightward in accordance therewith. When the player character 51 executes the limit break, the entire limit parameter is consumed, and the colored portions of the limit gauges 60a to 60c are filled in white.

In FIG. 13, commands 61a and 61b are displayed on a lower left side of the display screen 22. As displayed in the command 61a, when the O button 32c of the input unit 25 is pressed, the player character may make an attack by using a weapon. On the other hand, as displayed in the command 61b, when the X button 32b of the input unit 25 is pressed, a command menu is displayed as illustrated in FIG. 14. In FIG. 14, a plurality of commands 63, that is, abilities 63a, spells 63b, and items 63c are displayed in a command menu 62. The command is selected by using the cross key, and the O button 32a as a determination button is pressed such that an action to be executed by the player character is specified.

As one aspect of the fifth embodiment, it is possible to provide a game program achieving high amusement.

As one aspect of the fifth embodiment, a second action to be executed can be selected from a plurality of second actions, and thus the amusement of a game is improved.

As one aspect of the fifth embodiment, since the passage of time in a game is delayed while a second action to be executed is selected from among a plurality of second actions, the game progresses without time stopping, and it is also possible to secure the time required to examine which second action is to be executed.

As one aspect of the fifth embodiment, since the third action can be executed in response to an object executing a predetermined action on an opponent object or the object receiving a predetermined action from the opponent object, a player is required to play a game while taking into consideration that the third action can be executed in a situation in which a more advantageous result is obtained, and thus strategic performance required for the player is increased.

As one aspect of the fifth embodiment, since the third parameter is changed in response to an opponent object receiving a predetermined action from an object, and a special effect is generated in a game in a case where the third parameter satisfies a predetermined condition, a player is required to play the game while taking into consideration that the special effect is generated in a situation in which a more advantageous result is obtained, and thus strategic performance required for the player is increased.

As one aspect of the fifth embodiment, since the first parameter is increased with the passage of time, and the first parameter is decreased in a case where an object executes the second action, a player plays a game while taking into consideration a timing at which the first parameter is increased again and satisfies a predetermined first condition, and thus strategic performance required for the player is increased.

As one aspect of the fifth embodiment, since the second parameter is increased in response to an object executing a predetermined action on an opponent object and/or the object receiving a predetermined action from the opponent object, and the second parameter is decreased in a case where the object executes the third action, a player plays a game while taking into consideration a method in which the second parameter satisfies a predetermined second condition again, and thus strategic performance required for the player is increased.

As one aspect of the fifth embodiment, since the third parameter is increased in response to an opponent object receiving a predetermined action from an object, and the third parameter is decreased in a case where a special effect is generated, a player plays a game while taking into consideration a method in which the third parameter satisfies a predetermined third condition again, and thus strategic performance required for the player is increased.

As one aspect of the fifth embodiment, since the first parameter is changed in response to an object executing a predetermined action on an opponent object and/or the object receiving a predetermined action from the opponent object, a player is required to play a game while taking into consideration that the second action can be executed in a situation in which a more advantageous result is obtained, and thus strategic performance required for the player is increased.

As one aspect of the fifth embodiment, the first parameter, the second parameter, and/or the third parameter is displayed on a display screen by using a gauge, and thus a player can play a game while checking states of the parameters.

As one aspect of the fifth embodiment, since a gauge is partitioned into a plurality of regions, and a parameter corresponding to one region of the plurality of regions is reduced from the first parameter, the second parameter, and/or the third parameter, a player can cause an object to execute an action (a special effect of reducing the parameter corresponding to one region) of reducing the parameter corresponding to one region and can also cause the object to execute an action of reducing a parameter corresponding to the plurality of regions (can generate a special effect of reducing the parameter corresponding to the plurality of regions).

As one aspect of the fifth embodiment, since a predetermined action is an attack, it is possible to increase the motivation of a player to attack an opponent character or it is possible to make a strategy to receive an attack from the opponent character on purpose.

As one aspect of the fifth embodiment, an object that can be operated by a player is switchable, and thus it is possible to further increase strategic performance of a virtual battle.

In the fifth embodiment, the "computer apparatus", the "first action", the "first parameter", the "first condition", and the "second action" may respectively employ the contents described in the first embodiment within a necessary scope. In the fifth embodiment, the "virtual battle", the "predetermined action", the "second parameter", the "second condition", and the "third action" may respectively employ the contents described in the fourth embodiment within a necessary scope.

In the fifth embodiment, the "player character" means, for example, a character operated by a player. The "opponent character" means, for example, an opponent character performing a battle with a character operated by a player or a character serving as an ally of the player in a game.

In the fifth embodiment, the "attack" means, for example, in a virtual battle, an action of a character damaging a character of the other party to the battle. In the fifth embodiment, the "command menu" is, for example, a menu displaying options of actions (commands) that can be executed by a player character.

In the fifth embodiment, the "ability" means, for example, special performance of a player character, causing a virtual battle to advantageously progress. In the fifth embodiment, the "spell" is, for example, an action that can be used by a player character consuming a magic point (MP), and is to cause a virtual battle to advantageously progress by causing magical phenomena. In the fifth embodiment, the "item" is owned by, for example, a player character, and is used to cause a virtual battle to advantageously progress.

In the fifth embodiment, the "ATB parameter" is, for example, a parameter increased or decreased with the passage of time, and corresponds to the "first parameter". In the fifth embodiment, the "ATB gauge" is displayed, for example, on a display screen, and displays the ATB parameter in a bar-shaped graph.

In the fifth embodiment, the "limit parameter" is, for example, a parameter added or subtracted when an attack made by a player character hits an opponent character or a parameter added or subtracted when an attack made by the opponent character hits the player character, and corresponds to the "second parameter". In the fifth embodiment, the "limit gauge" is displayed, for example, on a display screen, and displays the limit parameter in a bar-shaped graph.

In the fifth embodiment, the "limit break" is, for example, an action capable of being executed by a player character by consuming the limit parameter, and is to attack an opponent character with power considerably greater than in a normal time.

In the fifth embodiment, the "focus parameter" is, for example, a parameter added or subtracted when an attack made by a player character hits an opponent character, and corresponds to the "third parameter". In the fifth embodiment, the "focus gauge" is displayed, for example, on a display screen, and displays the focus parameter in a bar-shaped graph.

Sixth Embodiment

Figure 15:
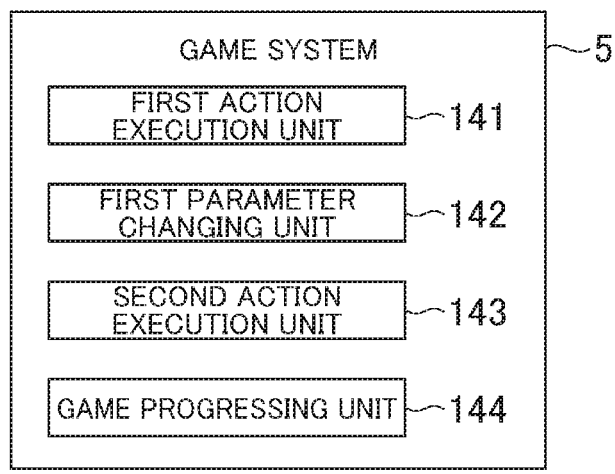
FIG. 15 is a block diagram illustrating a configuration of a game system corresponding to at least one of embodiments of the present invention.

A description will be made of an outline of a sixth embodiment of the present invention. FIG. 15 is a block diagram illustrating a configuration of a game system corresponding to at least one of embodiments of the present invention. A game system 5 includes a terminal apparatus operated by a player, and a server apparatus that is connectable to the terminal apparatus through communication. The game system 5 includes at least a first action execution unit 141, a first parameter changing unit 142, a second action execution unit 143, and a game progressing unit 144.

The first action execution unit 141 has a function of causing an object to execute a first action by a player's operation. The first parameter changing unit 142 has a function of changing a first parameter with the passage of time. The second action execution unit 143 has a function of causing the object to execute a second action by the player's operation in a case where the first parameter satisfies a predetermined first condition. The game progressing unit 144 has a function of causing a game to progress in response to execution of the first action and the second action.

Figure 16:
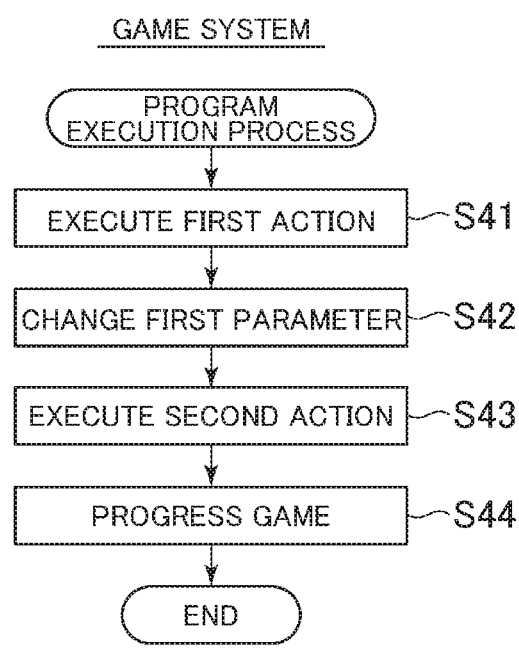
FIG. 16 is a flowchart illustrating a program execution process corresponding to at least one of embodiments of the present invention.

Next, a description will be made of a program execution process in the sixth embodiment of the present invention. FIG. 16 is a flowchart illustrating a program execution process corresponding to at least one of embodiments of the present invention.

The game system 5 causes an object to execute a first action by a player's operation (step S41). The game system 5 changes a first parameter with the passage of time (step S42). The game system 5 causes the object to execute a second action by the player's operation in a case where the first parameter satisfies a predetermined first condition (step S43). Next, the game system 5 causes a game to progress in response to execution of the first action and the second action (step S44), and terminates the process.

As one aspect of the sixth embodiment, it is possible to provide a game program achieving high amusement.

In the sixth embodiment, the "object", the "first action", the "first parameter", the "first condition", and the "second action" may respectively employ the contents described in the first embodiment within a necessary scope. In the sixth embodiment, the "terminal apparatus" means an apparatus that includes a storage and a controller and can perform calculation according to a predetermined program, and means, for example, a stationary game console, a portable game console, a wearable terminal, a desktop or notebook type personal computer, a tablet computer, or a PDA. In the sixth embodiment, the "server apparatus" means an apparatus that includes a storage and a controller and can perform calculation according to a predetermined program.

Seventh Embodiment

Figure 17:
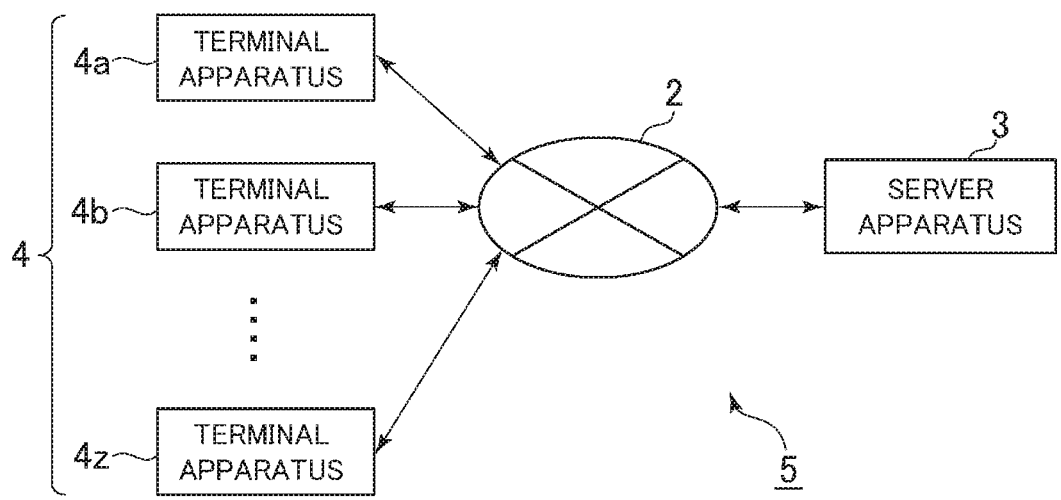
FIG. 17 is a block diagram illustrating a configuration of a game system corresponding to at least one of embodiments of the present invention.

Next, a description will be made of an outline of a seventh embodiment of the present invention. FIG. 17 is a block diagram illustrating a configuration of a game system corresponding to at least one of embodiments of the present invention. As illustrated, a game system 5 includes a plurality of terminal apparatuses 4 (terminal apparatuses 4a, 4b, . . . , and 4z) respectively operated by a plurality of players (players A, B, . . . , and Z), a communication network 2, and a server apparatus 3. The terminal apparatuses 4 are connected to the server apparatus 3 via the communication network 2. The terminal apparatus 4 and the server apparatus 3 may not be normally connected to each other, and may be connected to each other as necessary. The terminal apparatus 4 may have the same configuration as that of the computer apparatus illustrated in FIG. 9.

Figure 18:
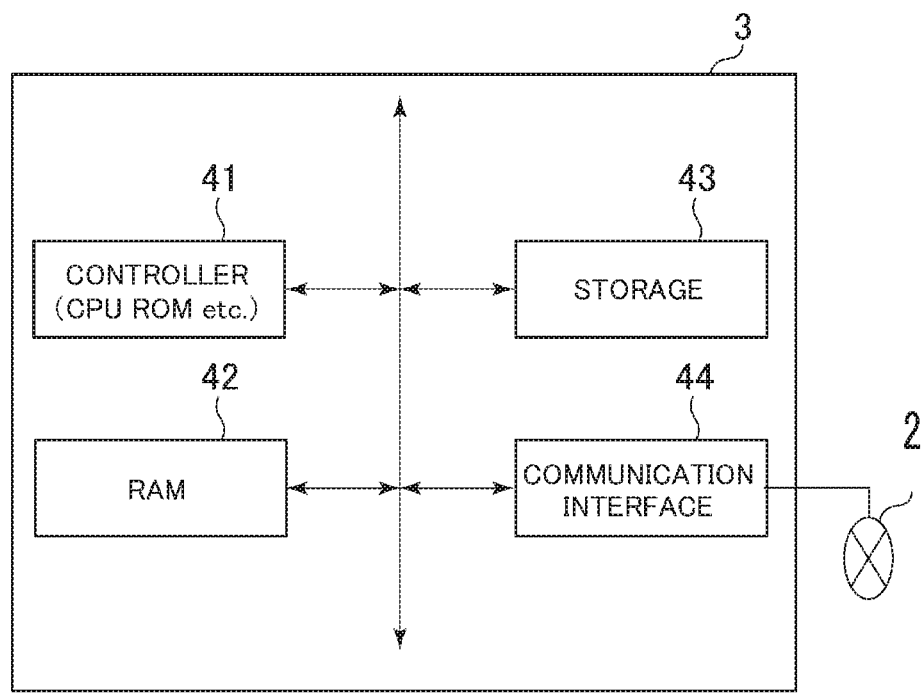
FIG. 18 is a block diagram illustrating a configuration of the server apparatus corresponding to at least one of embodiments of the present invention.

FIG. 18 is a block diagram illustrating a configuration of the server apparatus corresponding to at least one of embodiments of the present invention. The server apparatus 3 includes a controller 41, a RAM 42, a storage 43, and a communication interface 44 which are connected to each other via internal buses.

The controller 41 is configured with a CPU and a ROM, and executes a program stored in the storage 43 so as to control the server apparatus 3. The controller 41 includes an internal timer clocking time.

The RAM 42 is a work area of the controller 41. The storage 43 is a storage region used to preserve a program or data. The controller 41 reads a program and data from the RAM 42, and performs a program execution process on the basis of request information received from the terminal apparatus 4. The communication interface 44 may be connected to the communication network 2 in a wireless or wired manner, and may receive data via the communication network 2. The data received via the communication interface 44 is loaded to the RAM 42, and is subjected to a calculation process by the controller 41.

A description will be made of a case where a game program of the seventh embodiment is applied to an action RPG. A battle process and a first parameter changing process in the seventh embodiment may be executed by only one of the server apparatus 3 and the terminal apparatus 4, or some processes may be executed by the server apparatus 3, and processes other than the processes executed by the server apparatus 3 may be executed by the terminal apparatus 4.

A battle process in the seventh embodiment may be executed according to the flowchart of FIG. 11 in the same manner as in the fifth embodiment. More specifically, all or some of the processes in steps S101 to S179 are repeatedly executed until a victory or defeat of the player character is fixed and thus the battle is finished.

A first parameter changing process in the seventh embodiment may be executed according to the flowchart of FIG. 12 in the same manner as in the fifth embodiment. More specifically, all or some of the processes in steps S201 to S208 are repeatedly executed until a victory or defeat of the player character is fixed and thus the battle is finished.

A program execution screen in the seventh embodiment may employ the same configuration as that of the program execution screen illustrated in FIG. 13 and FIG. 14 in the same manner as in the fifth embodiment.

As one aspect of the seventh embodiment, it is possible to provide a game program achieving high amusement.

As one aspect of the seventh embodiment, a second action to be executed can be selected from a plurality of second actions, and thus the amusement of a game is improved.

As one aspect of the seventh embodiment, since the passage of time in a game is delayed while a second action to be executed is selected from among a plurality of second actions, the game progresses without time stopping, and it is also possible to secure the time required to examine which second action is to be executed.

As one aspect of the seventh embodiment, since the third action can be executed in response to an object executing a predetermined action on an opponent object or the object receiving a predetermined action from the opponent object, a player is required to play a game while taking into consideration that the third action can be executed in a situation in which a more advantageous result is obtained, and thus strategic performance required for the player is increased.

As one aspect of the seventh embodiment, since the third parameter is changed in response to an opponent object receiving a predetermined action from an object, and a special effect is generated in a game in a case where the third parameter satisfies a predetermined condition, a player is required to play the game while taking into consideration that the special effect is generated in a situation in which a more advantageous result is obtained, and thus strategic performance required for the player is increased.

As one aspect of the seventh embodiment, since the first parameter is increased with the passage of time, and the first parameter is decreased in a case where an object executes the second action, a player plays a game while taking into consideration a timing at which the first parameter is increased again and satisfies a predetermined first condition, and thus strategic performance required for the player is increased.

As one aspect of the seventh embodiment, since the second parameter is increased in response to an object executing a predetermined action on an opponent object and/or the object receiving a predetermined action from the opponent object, and the second parameter is decreased in a case where the object executes the third action, a player plays a game while taking into consideration a method in which the second parameter satisfies a predetermined second condition again, and thus strategic performance required for the player is increased.

As one aspect of the seventh embodiment, since the third parameter is increased in response to an opponent object receiving a predetermined action from an object, and the third parameter is decreased in a case where a special effect is generated, a player plays a game while taking into consideration a method in which the third parameter satisfies a predetermined third condition again, and thus strategic performance required for the player is increased.

As one aspect of the seventh embodiment, since the first parameter is changed in response to an object executing a predetermined action on an opponent object and/or the object receiving a predetermined action from the opponent object, a player is required to play a game while taking into consideration that the second action can be executed in a situation in which a more advantageous result is obtained, and thus strategic performance required for the player is increased.

As one aspect of the seventh embodiment, the first parameter, the second parameter, and/or the third parameter is displayed on a display screen by using gauges, and thus a player can play a game while checking states of the parameters.

As one aspect of the seventh embodiment, since a gauge is partitioned into a plurality of regions, and a parameter corresponding to one region of the plurality of regions is reduced from the first parameter, the second parameter, and/or the third parameter, a player can cause an object to execute an action (a special effect of reducing the parameter corresponding to one region) of reducing the parameter corresponding to one region and can also cause the object to execute an action of reducing a parameter corresponding to the plurality of regions (can generate a special effect of reducing the parameter corresponding to the plurality of regions).

As one aspect of the seventh embodiment, since a predetermined action is an attack, it is possible to increase the motivation of a player to attack an opponent character or it is possible to make a strategy to receive an attack from the opponent character on purpose.

As one aspect of the seventh embodiment, an object that can be operated by a player is changeable, and thus it is possible to further increase strategic performance of a virtual battle.

In the seventh embodiment, the "computer apparatus", the "first action", the "first parameter", the "first condition", and the "second action" may respectively employ the contents described in the first embodiment within a necessary scope.

In the seventh embodiment, the "virtual battle", the "predetermined action", the "second parameter", the "second condition", and the "third action" may respectively employ the contents described in the fourth embodiment within a necessary scope.

In the seventh embodiment, the "player character", the "opponent character", the "attack", the "command menu", the "attack", the "ability", the "spell", the "item", the "ATB parameter", the "ATB gauge", the "limit parameter", the "limit gauge", the "limit break", the "focus parameter", and the "focus gauge" may respectively employ the contents described in the fifth embodiment within a necessary scope.

APPENDIX

The description of the embodiments described above has been described so that those having ordinary knowledge in the field to which the invention belongs can carry out the following invention.

[1]
A game program executed in a computer apparatus, the game program causing the computer apparatus to function as:
  a first action executer that causes an object to execute a first action by a player's operation;
  a first parameter changer that changes a first parameter with the passage of time;
  a second action executer that causes the object to execute a second action by the player's operation in a case where the first parameter satisfies a predetermined first condition; and
  a game progressor that causes a game to progress in response to execution of the first action and the second action.

[2]
The game program according to the above [1], causing the computer apparatus to further function as:
  a second action selector that selects a second action to be executed from among a plurality of second actions by the player's operation,
  wherein the second action executer causes the object to execute the selected second action.

[3]
The game program according to the above [2], causing the computer apparatus to further function as:
  a time passage changer that delays the passage of time in the game while the second action selector selects the second action.

[4]
The game program according to any one of the above [1] to [3],
  wherein the game executes a virtual battle between the object and an opponent object,
  wherein the game program causes the computer apparatus to further function as:
  a second parameter changer that changes a second parameter in response to the object executing a predetermined action on the opponent object and/or the object receiving a predetermined action from the opponent object in the virtual battle; and
  a third action executer that causes the object to execute a third action in a case where the second parameter satisfies a predetermined second condition, and
  wherein the game progressor further causes the game to progress in response to execution of the third action.

[5]
The game program according to any one of the above [1] to [4],
  wherein the game executes a virtual battle between the object and an opponent object, and
  wherein the game program causes the computer apparatus to further function as:
  a third parameter changer that changes a third parameter in response to the opponent object receiving a predetermined action from the object in the virtual battle; and
  a special effect generator that generates a special effect in the game in a case where the third parameter satisfies a predetermined third condition.

[6]
The game program according to any one of the above [1] to [5],
  wherein the first parameter changer increases the first parameter with the passage of time, and decreases the first parameter in a case where the second action executer causes the object to execute the second action.

[7]
The game program according to any one of the above [4] to [6],
wherein the second parameter changer increases the second parameter in response to the object executing a predetermined action on the opponent object and/or the object receiving a predetermined action from the opponent object, and decreases the second parameter in a case where the third action executer causes the object to execute a third action.

[8]
The game program according to any one of the above [5] to [7],
wherein the third parameter changer increases the third parameter in response to the opponent object receiving a predetermined action from the object, and decreases the third parameter in a case where the special effect generator generates the special effect.

[9]
The game program according to any one of the above [1] to [8],
wherein the game executes a virtual battle between the object and an opponent object, and
wherein the first parameter changer changes the first parameter in response to the object executing a predetermined action on the opponent object and/or the object receiving a predetermined action from the opponent object in the virtual battle.

[10]
The game program according to any one of the above [1] to [9], causing the computer apparatus to further function as:
a parameter display that displays the first parameter, the second parameter, and/or the third parameter on a display device by using a gauge.

[11]
The game program according to the above [10],
wherein the gauge is partitioned into a plurality of regions, and
wherein the first parameter changer, the second parameter changer, and/or the third parameter changer reduces a parameter corresponding to one region of the plurality of regions from the first parameter, the second parameter, and/or the third parameter.

[12]
The game program according to any one of the above [4] to [11],
wherein the predetermined action is an attack.

[13]
The game program according to any one of the above [1] to [12],
wherein the player can operate a plurality of objects, and
wherein the game program causes the computer apparatus to further function as:
an object switcher that switches an object operated by the player to another object by the player's operation.

[14]
A game apparatus comprising:
a first action executer that causes an object to execute a first action by a player's operation;
a first parameter changer that changes a first parameter with the passage of time;
a second action executer that causes the object to execute a second action by the player's operation in a case where the first parameter satisfies a predetermined first condition; and
a game progressor that causes a game to progress in response to execution of the first action and the second action.

[15]
A game execution method executed in a computer apparatus, the game execution method comprising:
causing an object to execute a first action by a player's operation;
changing a first parameter with the passage of time;
causing the object to execute a second action by the player's operation in a case where the first parameter satisfies a predetermined first condition; and
causing a game to progress in response to execution of the first action and the second action.

[16]
A game program executed in a server apparatus of a game system including a terminal apparatus operated by a player and the server apparatus that is connectable to the terminal apparatus through communication, the game program causing the server apparatus to function as:
a first action executer that causes an object to execute a first action by the player's operation;
a first parameter changer that changes a first parameter with the passage of time;
a second action executer that causes the object to execute a second action by the player's operation in a case where the first parameter satisfies a predetermined first condition; and
a game progressor that causes a game to progress in response to execution of the first action and the second action.

[17]
A server apparatus in which the game program according to the above [16] is installed.

[18]
A game system including a terminal apparatus operated by a player and a server apparatus that is connectable to the terminal apparatus through communication, the game system comprising:
a first action executer that causes an object to execute a first action by the player's operation;
a first parameter changer that changes a first parameter with the passage of time;
a second action executer that causes the object to execute a second action by the player's operation in a case where the first parameter satisfies a predetermined first condition; and
a game progressor that causes a game to progress in response to execution of the first action and the second action.

[19]
A game program executed in a terminal apparatus of a game system including the terminal apparatus operated by a player and a server apparatus that is connectable to the terminal apparatus through communication, the game program causing the terminal apparatus to function as:
a first action executer that causes an object to execute a first action by the player's operation;
a first parameter changer that changes a first parameter with the passage of time;
a second action executer that causes the object to execute a second action by the player's operation in a case where the first parameter satisfies a predetermined first condition; and
a game progressor that causes a game to progress in response to execution of the first action and the second action.

[20]
A terminal apparatus in which the game program according to the above [19] is installed.

[21]
A game execution method executed in a server apparatus of a game system including a terminal apparatus operated by a player and the server apparatus that is connectable to the terminal apparatus through communication, the game execution method comprising:
   causing an object to execute a first action by a player's operation;
   changing a first parameter with the passage of time;
   causing the object to execute a second action by the player's operation in a case where the first parameter satisfies a predetermined first condition; and
   causing a game to progress in response to execution of the first action and the second action.

[22]
A game execution method executed in a game system including a terminal apparatus operated by a player and a server apparatus that is connectable to the terminal apparatus through communication, the game execution method comprising:
   causing an object to execute a first action by a player's operation;
   changing a first parameter with the passage of time;
   causing the object to execute a second action by the player's operation in a case where the first parameter satisfies a predetermined first condition; and
   causing a game to progress in response to execution of the first action and the second action.

The invention claimed is:

1. A non-transitory computer-readable recording medium including a game program executed in a computer apparatus, the game program causing the computer apparatus to function as:
   a first action executer that causes an object to execute a first action by a player's operation;
   a first parameter changer that changes a first parameter with passage of time and changes the first parameter in response to the object executing the first action;
   a second action option display that displays a selectable option of a second action as a list by the player's operation in a case where the first parameter satisfies a predetermined first condition;
   an action selector that selects the second action to be executed from among the displayed option of the second action by the player's operation;
   a second action executer that causes the object to execute the selected second action;
   a second parameter changer that changes a second parameter in response to the object executing a predetermined action on an opponent object and/or the object receiving a predetermined action from the opponent object in a virtual battle;
   a third action option display that displays a selectable option of a third action by the player's operation in a case where the second parameter satisfies a predetermined second condition;
   a third action executer that causes the object to execute the third action in the case where the second parameter satisfies the predetermined second condition;
   a parameter display that displays a parameter gauge that is partitioned into a plurality of regions;
   a game progressor that causes a game to progress in response to execution of the first action and the second action,
   wherein the game executes the virtual battle between the object and the opponent object,
   wherein the first parameter changer reduces a parameter corresponding to one region of the plurality of regions from the first parameter in a case where the selected second action is executed,
   wherein the game progressor further causes the game to progress in response to execution of the third action,
   wherein the first parameter and the second parameter have different conditions for change, and
   wherein the second action option is different from the third action option in content of actions provided.

2. The non-transitory computer-readable recording medium according to claim 1, causing the computer apparatus to further function as:
   a time passage changer that delays the passage of time in the game while the action selector selects the second action.

3. The non-transitory computer-readable recording medium according to claim 1,
   wherein the game program causes the computer apparatus to further function as:
   a third parameter changer that changes an additional parameter in response to the opponent object receiving a predetermined action from the object in the virtual battle; and
   a special effect generator that generates a special effect in the game in a case where the additional parameter satisfies a predetermined third condition.

4. The non-transitory computer-readable recording medium according to claim 3,
   wherein the third parameter changer increases the additional parameter in response to the opponent object receiving a predetermined action from the object, and decreases the additional parameter in a case where the special effect generator generates the special effect.

5. The non-transitory computer-readable recording medium according to claim 1,
   wherein the first parameter changer increases the first parameter with the passage of time, and decreases the first parameter in a case where the second action executer causes the object to execute the second action.

6. The non-transitory computer-readable recording medium according to claim 1,
   wherein the second parameter changer increases the second parameter in response to the object executing a predetermined action on the opponent object and/or the object receiving a predetermined action from the opponent object, and decreases the second parameter in a case where the third action executer causes the object to execute the third action.

7. The non-transitory computer-readable recording medium according to claim 1,
   wherein the first parameter changer changes the first parameter in response to the object executing a predetermined action on the opponent object and/or the object receiving a predetermined action from the opponent object in the virtual battle.

8. The non-transitory computer-readable recording medium according to claim 1,
   wherein the predetermined action is an attack.

9. The non-transitory computer-readable recording medium according to claim 1,
   wherein the player can operate a plurality of objects, and
   wherein the game program causes the computer apparatus to further function as:

an object switcher that switches an object operated by the player to another object by the player's operation.

10. A game apparatus comprising:

a first action executer that causes an object to execute a first action by a player's operation;

a first parameter changer that changes a first parameter with passage of time and changes the first parameter in response to the object executing the first action;

a second action option display that displays a selectable option of a second action as a list by the player's operation in a case where the first parameter satisfies a predetermined first condition;

an action selector that selects the second action to be executed from among the displayed option of the second action by the player's operation;

a second action executer that causes the object to execute the selected second action;

a second parameter changer that changes a second parameter in response to the object executing a predetermined action on an opponent object and/or the object receiving a predetermined action from the opponent object in a virtual battle;

a third action option display that displays a selectable option of a third action by the player's operation in a case where the second parameter satisfies a predetermined second condition;

a third action executer that causes the object to execute the third action in the case where the second parameter satisfies the predetermined second condition;

a parameter display that displays a parameter gauge that is partitioned into a plurality of regions;

a game progressor that causes a game to progress in response to execution of the first action and the second action, wherein the game executes the virtual battle between the object and the opponent object, wherein the first parameter changer reduces a parameter corresponding to one region of the plurality of regions from the first parameter in a case where the selected second action is executed, wherein the game progressor further causes the game to progress in response to execution of the third action, wherein the first parameter and the second parameter have different conditions for change, and wherein the second action option is different from the third action option in content of actions provided.

11. A game execution method executed in a computer apparatus, the game execution method comprising:

causing an object to execute a first action by a player's operation;

changing a first parameter with passage of time and changing the first parameter in response to the object executing the first action;

displaying a selectable option of a second action as a list by the player's operation in a case where the first parameter satisfies a predetermined first condition;

selecting the second action to be executed from among the displayed option of the second action by the player's operation;

causing the object to execute the selected second action;

changing a second parameter in response to the object executing a predetermined action on an opponent object and/or the object receiving a predetermined action from the opponent object in a virtual battle;

displaying a selectable option of a third action by the player's operation in a case where the second parameter satisfies a predetermined second condition;

causing the object to execute the third action in the case where the second parameter satisfies the predetermined second condition;

displaying a parameter gauge that is partitioned into a plurality of regions;

causing a game to progress in response to execution of the first action and the second action;

executing the virtual battle between the object and the opponent object;

reducing a parameter corresponding to one region of the plurality of regions from the first parameter in a case where the selected second action is executed; and further causing the game to progress in response to execution of the third action, wherein the first parameter and the second parameter have different conditions for change, and wherein the second action option is different from the third action option in content of actions provided.

* * * * *